(12) United States Patent
Mallet et al.

(10) Patent No.: US 9,759,826 B2
(45) Date of Patent: Sep. 12, 2017

(54) SYSTEM AND METHOD FOR GENERATING AN IMPLICIT MODEL OF GEOLOGICAL HORIZONS

(75) Inventors: Jean-Laurent Mallet, Garnich (LU); Emmanuel Labrunye, Nancy (FR); Ronit Levy, Herzliya (IL); Sharon Hezy, Tel-Aviv (IL)

(73) Assignees: PARADIGM SCIENCES LTD., Grand Cayman (KY); Jean-Laurent Mallet, Luxembourg-Beggen (LU)

(*) Notice: Subject to any disclaimer, the term of this patent is extended or adjusted under 35 U.S.C. 154(b) by 896 days.

(21) Appl. No.: 13/461,361

(22) Filed: May 1, 2012

(65) Prior Publication Data

US 2013/0262052 A1  Oct. 3, 2013

Related U.S. Application Data

(60) Provisional application No. 61/619,547, filed on Apr. 3, 2012.

(51) Int. Cl.
*G06F 7/60* (2006.01)
*G01V 1/30* (2006.01)

(52) U.S. Cl.
CPC .................................. *G01V 1/302* (2013.01)

(58) Field of Classification Search
CPC .................................................... G01V 1/302
(Continued)

(56) References Cited

U.S. PATENT DOCUMENTS 4,964,099 A   10/1990   Carron
4,991,095 A    2/1991   Swanson
(Continued)

FOREIGN PATENT DOCUMENTS

AU   2002329615   7/2002
CA      2455810   7/2005
(Continued)

OTHER PUBLICATIONS

G. Caumon et al., "Surface-based 3D Modeling of Geological Structures," 2009, Mathematical Geosciences, vol. 41, pp. 927-945.*

(Continued)

*Primary Examiner* — David Silver
*Assistant Examiner* — Russ Guill
(74) *Attorney, Agent, or Firm* — Pearl Cohen Zedek Latzer Baratz LLP

(57) ABSTRACT

A method and system for generating a model function h(x,y,z) implicitly representing geologic horizons. Geological data representing a fault network and horizons automatically extracted from seismic data may be received. A 3D mesh may be generated and divided into a plurality of fault blocks by the fault network. A discrete function h(x,y,z) may be defined having values of the geological data representing horizons at discrete nodes of the mesh. Constraints may be installed on the discrete function h(x,y,z) defining surfaces representing horizons. Constraints may be installed on the discrete function h(x,y,z) to ensure the uniqueness of the function h(x,y,z). The discrete function h(x,y,z) may be interpolated at the nodes of the mesh to create a piecewise continuous function h (x,y,z) while honoring the constraints. The piecewise continuous horizon function h(x,y,z) may be synchronized across multiple fault blocks. A model of the piecewise continuous horizon function h(x,y,z) may be displayed.

34 Claims, 17 Drawing Sheets

(58) Field of Classification Search
USPC .......................................................... 703/2
See application file for complete search history.

(56) References Cited

U.S. PATENT DOCUMENTS

| | | | |
|---|---|---|---|
| 5,465,323 A | 11/1995 | Mallet | |
| 5,475,589 A | 12/1995 | Armitage | |
| 5,586,082 A | 12/1996 | Anderson et al. | |
| 5,671,136 A | 9/1997 | Willhoit | |
| 5,844,799 A | 12/1998 | Joseph et al. | |
| 5,995,907 A | 11/1999 | Van Bemmel et al. | |
| 6,018,498 A | 1/2000 | Neff et al. | |
| 6,106,561 A | 8/2000 | Farmer | |
| 6,138,076 A | 10/2000 | Graf et al. | |
| 6,151,555 A | 11/2000 | Van Bemmel et al. | |
| 6,246,963 B1 | 6/2001 | Cross et al. | |
| 6,278,949 B1 | 8/2001 | Alam | |
| 6,353,577 B1 | 3/2002 | Orban et al. | |
| 6,597,995 B1 | 7/2003 | Cornu et al. | |
| 6,725,174 B2 | 4/2004 | Bouts et al. | |
| 6,771,800 B2 | 8/2004 | Keskes et al. | |
| 6,778,909 B1 | 8/2004 | Popovici et al. | |
| 6,791,900 B2 | 9/2004 | Gillard et al. | |
| 6,820,043 B2 | 11/2004 | Mallet et al. | |
| 6,847,737 B1 | 1/2005 | Kouri et al. | |
| 6,850,845 B2 | 2/2005 | Stark | |
| 6,889,142 B2 | 5/2005 | Schonewille | |
| 6,904,169 B2 | 6/2005 | Kalevo et al. | |
| 7,024,021 B2 | 4/2006 | Dunn et al. | |
| 7,089,166 B2 | 8/2006 | Malthe-Sorenssen et al. | |
| 7,126,340 B1 | 10/2006 | Ameen et al. | |
| 7,187,794 B2 | 3/2007 | Liang et al. | |
| 7,227,983 B1 | 6/2007 | Christian et al. | |
| 7,248,539 B2 | 7/2007 | Borgos et al. | |
| 7,280,918 B2 | 10/2007 | Williams | |
| 7,412,363 B2 | 8/2008 | Callegari | |
| 7,418,149 B2 | 8/2008 | Dinh et al. | |
| 7,446,765 B2 | 11/2008 | Dugge | |
| 7,480,205 B2 | 1/2009 | Wei et al. | |
| 7,523,024 B2 | 4/2009 | Endres et al. | |
| 7,561,992 B2 | 7/2009 | Leflon et al. | |
| 7,660,481 B2 | 2/2010 | Schaap et al. | |
| 7,711,532 B2 | 5/2010 | Dulac et al. | |
| 7,742,875 B2 | 6/2010 | Li et al. | |
| 7,744,534 B2 | 6/2010 | Chalana et al. | |
| 7,844,402 B2 | 11/2010 | Klein et al. | |
| 7,884,402 B2 | 2/2011 | Ki | |
| 8,010,294 B2 | 8/2011 | Dorn et al. | |
| 8,065,088 B2 | 11/2011 | Dorn et al. | |
| 8,150,663 B2 | 4/2012 | Mallet | |
| 8,274,859 B2 | 9/2012 | Maucec et al. | |
| 8,600,708 B1 | 12/2013 | Mallet et al. | |
| 8,635,052 B1 | 1/2014 | Mallet et al. | |
| 8,711,140 B1 | 4/2014 | Mallet | |
| 8,743,115 B1 | 6/2014 | Mallet et al. | |
| 2001/0036294 A1 | 11/2001 | Keskes et al. | |
| 2002/0032550 A1 | 3/2002 | Ward et al. | |
| 2003/0023383 A1 | 1/2003 | Stark et al. | |
| 2003/0216897 A1 | 11/2003 | Endres et al. | |
| 2004/0193960 A1* | 9/2004 | Vassilev ................ | G01V 11/00 714/38.1 |
| 2004/0260476 A1 | 12/2004 | Borgos et al. | |
| 2004/0267454 A1 | 12/2004 | Granjeon | |
| 2005/0114831 A1 | 5/2005 | Callegari et al. | |
| 2005/0216197 A1 | 9/2005 | Zamora et al. | |
| 2006/0004522 A1 | 1/2006 | Cacas | |
| 2006/0122780 A1 | 6/2006 | Cohen et al. | |
| 2006/0129359 A1 | 6/2006 | Dulac | |
| 2007/0024623 A1 | 2/2007 | Dugge | |
| 2008/0021684 A1 | 1/2008 | Dulac et al. | |
| 2008/0243447 A1 | 10/2008 | Roggero et al. | |
| 2008/0273421 A1 | 11/2008 | Koren et al. | |
| 2009/0122060 A1 | 5/2009 | Porat et al. | |
| 2009/0132170 A1* | 5/2009 | Krueger et al. ............... | 702/16 |
| 2009/0192717 A1* | 7/2009 | Iversen et al. ................ | 702/11 |
| 2010/0156920 A1 | 6/2010 | Shin et al. | |
| 2011/0015910 A1 | 1/2011 | Ran | |
| 2011/0054857 A1 | 3/2011 | Moguchaya | |
| 2011/0115787 A1 | 5/2011 | Kadlec | |
| 2012/0037379 A1 | 2/2012 | Hilliard et al. | |
| 2012/0072116 A1 | 3/2012 | Dorn et al. | |
| 2013/0204598 A1 | 8/2013 | Mallet et al. | |
| 2013/0231903 A1 | 9/2013 | Li et al. | |
| 2013/0238297 A1* | 9/2013 | Lepage et al. ................. | 703/2 |

FOREIGN PATENT DOCUMENTS

| | | |
|---|---|---|
| FR | 2841343 | 12/2003 |
| GB | 2444506 | 6/2008 |
| GB | 2444167 | 3/2011 |
| RU | 2145100 | 1/2000 |
| WO | WO 99/41676 | 8/1999 |
| WO | WO 03/009003 | 1/2003 |
| WO | WO 03/050766 | 6/2003 |
| WO | WO 2006/007466 | 1/2006 |
| WO | WO 2008/005690 | 1/2008 |

OTHER PUBLICATIONS

P. Calcagno et al., "Geological modelling from field data and geological knowledge Part I. Modelling method coupling 3D potential-field interpolation and geological rules," 2008, Physics of the Earth and Planetary Interiors, vol. 171, pp. 147-157.*

Fitsum Admasu et al., "Automatic method for correlating horizons across faults in 3D seismic data," 2004, Proceedings of the 2004 IEEE Computer Society Conference on Computer Vision and Pattern Recognition, six pages.*

P. McInerney et al., "Improved 3D geology modelling using an implicit function interpolator and forward modelling of potential field data," 2007, Proceedings of Exploration 07: Fifth Decennial International Conference on Mineral Exploration, pp. 919-922.*

Valeria Cristina F. Narbosa et al., "Gravity inversion of basement relief using approximate equality constraints on depths," 1997, Geophysics, vol. 62, No. 6, pp. 1745 1757.*

Walter E. Medeiros et al., "Geophysical inversion using approximate equality constraints," 1996, Geophysics, vol. 61, No. 6, pp. 1678-1688.*

U.S. Appl. No. 13/458,264, filed Apr. 24, 2012, Li et al.

Bakker, "Image Structure Analysis for Seismic Interpretation," doctoral thesis, publicly defended on Jun. 4, 2002.

Carr et al., "Reconstruction and Representation of 3D Objects with Radial Basis functions," ACM SIGGRAPH 2001, ACM Press New York, Computer Graphics Proceedings, pp. 67-76, 2001 (ISBN 1-58113-374-X).

Caumon et al. "Building and Editing a Sealed Geological Model," Mathematical Geology, vol. 36, No. 4, May 2004; pp. 405-424.

Chiles et al., "Modelling the Geometry of Geological Units and its Uncertainty in 3D From Structural Data: The Potential-Field Method," Orebody Modelling and Strategic Mine Planning, pp. 313-320, Nov. 22-24, 2004.

Cignoni et al., "Multiresolution Representation and Visualization of Volume Data," IEEE Transactions on Visualizations and Computer Graphics; 3(4), Oct.-Dec. 1997; pp. 352-369.

Claerbout, "Fundamentals of Geophysical Data Processing with Applications to Petroleum Prospecting," Blackwell Scientific Publications, 1985.

Clawson et al., "The Value of 3D Seismic Attributes for Illuminating Deep Water Deposits by Seismic Forward Modeling of the Brushy Canyon Formation," 2003 SEG Annual Meeting, Oct. 26-31, 2003, Dallas, Texas (only Abstract submitted).

Courrioux et al., "3D Volumetric modelling of Cadomian Terranes (Northern Brittany, France): an automatic method using Voronoi diagrams," Tectonophysics 331(1-2), Feb. 2001, pp. 181-196.

Cremeens et al., "On Chronostratigraphy, Pedostratigraphy, and Archaeological Context," Soil Science Society of America, 1995.

Cuisenaire, "Distance Transformations: Fast Algorithms and Applications to Medical Image Processing," Laboratoire de Telecommunications et Teledetection; Oct. 1999.

(56) References Cited

OTHER PUBLICATIONS

Davies, "Conditioning Poorly Sampled Gathers for Pre and Post Stack Analysis," Journal of Conference Abstracts, 2002, vol. 7, No. 2, pp. 142-143.
De Groot et al., "How to create and use 3D Wheeler transformed seismic volumes," SEG/New Orleans 2006 Annual Meeting, pp. 1038-1042.
Dorn, "Chapter 13, Interpreting 3-D Seismic Data," The Leading Edge, Sep. 1998, p. 1261-1272.
Dulac, "Advances in chrono-stratigraphic interpretation modeling," First Break, vol. 27, Oct. 2009.
Durand-Riard et al., "Balanced restoration of geological volumes with relaxed meshing constraints," Computers and Geosciences, vol. 36, No. 4, pp. 441-452, Nov. 17, 2010.
EAGE Daily News, "Paradigm is Redefining Interpretation," 2011 EAGE Conference & Exhibition, May 2011.
Egan et al., "Three-Dimensional Modelling and Visualisation in Structural Geology: New Techniques for the Restoration and Balancing of Volumes," Proceedings of GIG Conference on Geological Visualisation—the Intelligent Picture?, British Geological Survey, Oct. 1996.
Escalona et al., Sequence-stratigraphic analysis of Eocene clastic foreland basin deposits in central Lake Maracaibo using high-resolution well correlation and 3-D seismic data, AAPG Bulletin, vol. 90, No. 4, pp. 581-623 (Apr. 2006) (only Abstract submitted).
Frank et al., "3D-reconstruction of Complex Geological Interfaces from Irregularly Distributed and Noisy Point Data," Computer & Geosciences 33 (2007) 932-943.
Frank, "Advanced Visualization and Modeling of Tetrahedral Meshes," Doctorat de l'Institut National Poly technique de Lorraine; pp. 1-140; 2006.
Gibbons, "Seismic Applications Overview," Society of Petroleum Engineers, Aug. 2003, 9 pages.
Harris et al., "Fault Seal Risk Volumes—A new Tool for the Assessment of Reservoir Compartmentalisation" 71st EAGE Conference & Exhibition—Amsterdam, The Netherlands, Jun. 8-11, 2009.
Jayr et al., "The Need for a Correct Geological Modelling Support: the Advent of the UVT-Transform," First Break, vol. 26, Oct. 2008, pp. 73-79.
Jentzsch et al., "Kinematic Subsidence Modelling of the Lower Rhine Basin," Netherlands Journal of Geosciences, vol. 81, No. 2, pp. 231-239 (2002).
Jones, "Data structures for three-dimensional spatial information systems in geology," Int. J. Geographical Information Systems, 3(1), 1989, pp. 15-30.
Karimi et al., "Stratigraphic Coordinate System", SEG San Antonio 2011 Annual Meeting, pp. 960-964.
Ledez, "Modelisation D'Objets Naturals par Formulation Implicite," Ecole Nationale Superieure de Geologie; Oct. 28, 2003; pp. 1-158, see English Abstract.
Lee et al., "Pitfalls in Seismic Data Flattening," The Leading Edge, Feb. 2001, pp. 161-164.
Lepage, "Generation de Maillages Tridimensionnels Pour la Simulation des Phenomenes Physiques en Geosciences," Ecole National Superieure de Geologie; Oct. 28, 2003; pp. 1-224, see English Abstract.
Lessenger et al., "An Inverse Stratigraphic Simulation Model: Is stratigraphic Inversion Possible?" Energy Exploration & Exploitation, vol. 14, No. 6, pp. 627-637 (1996) (only Abstract submitted).
Ligtenberg et al., "Sequence Stratigraphic Interpretation in the Wheeler Transformed (Flattened) Seismic Domain," EAGE 68th Conference & Exhibition—Vienna, Austria, Jun. 12-15, 2006.
Liwanag, "Reservoir Characterisation, Introducing geological processes in reservoir models," GEO ExPro Oct. 2005, pp. 28-32.
Lixin, "Topological relations embodied in a generalized tri-prism (GTP) model for a 3D geoscience modeling system," Computer & Geosciences 30(4), May 2004, pp. 405-418.
Lomask et al., "Flattening Without Picking," Geophysics, vol. 71, No. 4, pp. P13-P20, Jul.-Aug. 2006.
Lomask et al., "Flattening Without Picking," Stanford Exploration Project, Report 112, Nov. 11, 2002, pp. 141-150.
Lomask et al., "Update on Flattening Without Picking," Stanford Exploration Project, Report 120, May 3, 2005, pp. 137-159.
Lomask, "Flattening 3-D Seismic Cubes Without Picking," Jan. 8, 2004.
Luo et al., "Non-vertical deformations for seismic image flattening", SEG San Antonio 2011 Annual Meeting, pp. 970-975.
Mallet, "Discrete Smooth Interpolation in Geometric Modelling," Journal of Computer Aided Design, 24(4), 1992, pp. 178-191.
Mallet, "Numerical Earth Models," 2008 EAGE Publications, ISBN 978-90-73781-63-4, p. 29-42, 147-157.
Mallet, "Space-time Mathematical Framework for Sedimentary Geology," Journal of Mathematical Geology, vol. 36, No. 1, Jan. 2004, pp. 1-32.
Mallet, Geomodeling (Book chapter); Chapter 6; Oxford University Press; cover and preface pages and pp. 244-315, 2002.
Mallet, *Geomodeling*, Oxford University Press, Sep. 22, 2004 (ISBN 0-19-514460.0).
Mitchum et al., "Seismic Stratigraphy and Global Changes of Sea Level, Part 6: Stratigraphic Interpretation of Seismic Reflection Patterns in Depositional Sequences,", pp. 117-133.
Monsen et al., "Geological process controlled interpretation based on 3D Wheeler diagram generation," SEG/San Antonio 2007 Annual Meeting, pp. 885-889.
Moretti et al., "KINE3D: a New 3D Restoration Method Based on a Mixed Approach Linking Geometry and Geomechanics," Oil & Gas Science and Technology, Rev. IFP, vol. 61 (2005), No. 2, pp. 277-289.
Moyen et al., "3D-Parameterization of the 3D Geological Space—The Geochron Model," 9th European Conference on the Mathematics of Oil Recovery, Geological Modelling I, Aug. 30, 2004.
Moyen, "Paramétrisation 3D de L'espace en Géologie Sédimentaire: Le Modèle Geochron Thèse," Doctorat de l'Institut National Polytechnique de Lorraine, Jun. 9, 2005 (original text in French and English translation).
Müller et al. "3D Restoration and mechanical properties," from structure.harvard.edu/projects/restoration, Harvard University Structural Geology and Earth Resources Group, 2005, accessed on Aug. 21, 2012.
OpendTect Workflows Documentation version 4.2, dGB Beheer B.V., dGB Earth Sciences, Copyright © 2002-2010.
Oyedele, "3D High Resolution Seismic Imaging of Middle-Late Quaternary Depositional Systems, Southeast Green Canyon, Sigsbee Escarpment, Gulf of Mexico," Thesis presented to the Faculty of the Dept. of Geosciences at the University of Houston, Aug. 2005.
Paradigm Geotechnology: GOCAD Suite 2.5 User Guide, published Sep. 15, 2007.
Paradigm(TM) Skua(TM) 2009 User Guide: Part V Seismic Interpretation Modeling, Feb. 3, 2009.
Rouby et al., "3-D Restoration of Complexly Folded and Faulted Surfaces Using Multiple Unfolding Mechanisms." AAPG Bulletin, vol. 84, No. 6, p. 805-829 (Jun. 2000).
Rumpf et al., "A Continuous Skeletonization Method Based on Level Sets," Joint EUROPGRAPHICS—IEEE Symposium on Visualization, pp. 151-157 (2002).
Saito, "New Algorithms for Euclidean Distance Transformation of an n-Dimensional Digitized Picture with Applications," Pattern Recognition, 27(11) 1994; pp. 1551-1565.
Samson et al., "Quantifying the Impact of Structural Uncertainties on Gross-Rock Volume Estimates", SPE 1996, pp. 381-392.
Stark, "Generation of a 3D seismic 'Wheeler Diagram' from a high resolution Age Volume," pp. 782-786, submitted to the 75th Annual SEG Convention, Nov. 6-11, 2005, Houston, TX.
Stark, "Relative Geologic Time (Age) Volumes—Relating Every Seismic Sample to a Geologically Reasonable Horizon," The Leading Edge, Sep. 2004, pp. 928-932.
Terraspark Geosciences, "Geoscience Interpretation Visualization Consortium (GIVC)," http://terraspark.com/GIVC.consort, accessed on May 11, 2006.

(56) References Cited

OTHER PUBLICATIONS

Tertois et al., "Editing faults within tetrahedral volume models in real time," In Jolley, S.J., Barr, D., Walsh, J.J. et al. (Eds), Structurally Complex Reservoirs, London, UK: Geological Society of London, Special Publications 2007; v. 292; p. 89-101 (doi: 10.1 144/SP292.5).

Tertois et al., Real-time Tetrahedral Volume Editing Accounting for Discontinuities; Ninth International Conference on Computer Aided Design and Computer Graphics (CAD/CG 2005) 2005 IEEE; pp. 1-6).

Tertois, "Création et édition de modèles géologiques par Champs de potential: Application au modele GeoChron—Thèse," Institut National Polytechnique de Lorraine, Jun. 21, 2007.

Tertois, Preserving Geological Information During Real-Time Editing of Faults in Tetrahedral Models; Int. Assoc. for Mathematic Geology Xith Internationbal Congress Universite de Liege—Belgium; 2005; S14-24; pp. 1-4.

Thomsen et al., "Towards a balanced 3D Kinematic Model of a Faulted Domain—the Bergheim Open Pit Mine, Lower Rhine Basin," Netherlands Journal of Geoscience, vol. 81, No. 2, pp. 241-250 (2002).

Thore et al., Integration of Structural Uncertainties into Reservoir grids construction—70th EAGE Conference & Exhibition—Rome, Italy, Jun. 9-12, 2008.

Trudgill et al., "Integrating 3D Seismic Data with Structural Restorations to Elucidate the Evolution of a Stepped Counter-Regional Salt System, Eastern Louisiana Shelf, Northern Gulf of Mexico," pp. 165-176. (2004).

Wen et al., "Use of Border Regions for Improved Permeability Upscaling," Mathematical Geology, 35(5), Jul. 2003; pp. 521-547.

Wood et al., "Applying Sequence Stratigraphy and Seismic Stratal Slice Technology in the Gulf of Mexico," GASTIPS, Lang et al. (Eds.), Winter 2003, vol. 9, No. 1, pp. 10-21.

Zeng et al., High-frequency Sequence Stratigraphy from Seismic Sedimentology: Applied to Miocene, Vermilion Block 50, Tiget Shoal Area Offshoure Louisiana, AAPG Bulletin, Feb. 2004, vol. 88, No. 2, pp. 153-174 (only Abstract submitted).

Zeng et al., "Interpretive Advantages of 90 Degree-Phase Wavelets: Part 2—Seismic Applications," Geophysics, SEG, vol. 70, No. 3, May 2005-Jun. 2005. pp. C-17-C-24.

Zeng et al., "Seismic Frequency Control on Carbonate Seismic Stratigraphy: A Case Study of the Kingdom Abo Sequence, West Texas," AAPG Bulletin, vol. 87, Issue No. 2, pp. 273-293 (2003) (only Abstract submitted).

Zeng et al., "Stratal Slicing of Miocene-Pliocene Sediments in Vermilion Block 50-Tiger Shoal Area, Offshore Louisiana," The Leading Edge, Offshore Technology Special Section, vol. 20, No. 4, Apr. 2001, pp. 408-418.

Zeng et al., "Stratal Slicing, Part I: Realistic 3-D Seismic Model," Geophysics, Seg, vol. 63, No. 2, Mar. 1998-Apr. 1998, pp. 502-513.

Zeng et al., "Stratal Slicing, Part II: Read 3-D Seismic Data," Geophysics, vol. 63, No. 2 (Mar.-Apr. 1998); pp. 514-522.

Zeng et al., "Three-D Seismic Facies Imaging by Stratal Slicing of Miocene-Pliocene Sediments in Vermilion Block 50-Tiger Shoal Area, Offshore Louisiana," Secondary Gas Recovery, AAPG 2000.

Zeng, "From Seismic Stratigraphy to Seismic Sedimentology: A Sensible Transition," GCAGS Transactions, vol. 51, pp. 413-420 (2001) (only Abstract submitted).

Zeng, "Stratal Slicing: Benefits and Challenges," The Leading Edge 29, 1040 (Sep. 2010).

International Search Report issued for PCT International Application No. PCT/IB2004/002030, issued on Jan. 25, 2005.

Notice of Allowance issued for U.S. Appl. No. 11/628,559, mailed on Dec. 24, 2009.

Office Action issued for U.S. Appl. No. 11/628,559, mailed on Jun. 24, 2009.

Office Action issued for U.S. Appl. No. 12/791,483, mailed on Aug. 17, 2012.

Office Action issued for U.S. Appl. No. 12/791,370, mailed on Nov. 26, 2012.

"Geomodeling Releases VisualVoxAT™ 6.2 Software—Introducing the Geobody Paintbrush," New Release, Sep. 24, 2007, printed from http://www.geomodeling.com/news_22.htm; on Oct. 5, 2009.

Labrunye et al., "New 3D flattened space for seismic interpretation," SEG Houston 2009 International Exposition and Annual Meeting, pp. 1132-1136.

Smith et al., "SUSAN—A New Approach to Low Level Image Processing," International Journal of Computer Vision, 1997, vol. 23, Iss. 1, pp. 45-78.

Souche, "Integration of fault models into unstructured grids and geo-chronological space," 24$^{th}$ GOCAD Meeting, Jun. 2004.

Zeng et al., "Stratal Slicing and Seismic Facies Imaging," Bureau of Economic Geology, The University of Texas at Austin, 1998. (only Abstract submitted).

Notice of Allowance issued for U.S. Appl. No. 12/791,370, mailed on Jul. 22, 2013.

Notice of Allowance issued for U.S. Appl. No. 12/791,352, mailed on Dec. 6, 2013.

Notice of Allowance issued for U.S. Appl. No. 12/909,981, mailed on Jan. 27, 2014.

U.S. Appl. No. 13/862,680, filed Apr. 15, 2013, Tertois et al.

Caumon et al., "Elements for Stochastic Structural Perturbation of Stratigraphic Models," Proc. Petroleum Geostatistics, Sep. 10-14, 2007.

* cited by examiner

SYSTEM AND METHOD FOR GENERATING AN IMPLICIT MODEL OF GEOLOGICAL HORIZONS

PRIOR APPLICATION DATA

This application claims the benefit of prior U.S. Provisional Application Ser. No. 61/619,547, filed Apr. 3, 2012, which is incorporated by reference herein in its entirety.

FIELD OF THE INVENTION

The invention pertains to the general field of modeling stratified terrains in the subsurface.

More precisely, a system and method are proposed for generating an implicit model of geological horizons, for example, when a fault network and geological data related to horizons are given. Geological data may include sampled information about the location and/or shape of the horizon and may be automatically extracted from, for example, seismic data such as a seismic cube or a set of seismic lines, well-markers and/or normal vectors of the horizon surfaces. In some cases, the location and/or shape information of the horizon may be fragmented and incomplete over the studied domain. Embodiments of the invention allow an infinite set of all the possible geological horizons to be modeled automatically and simultaneously, for example, to minimize, within each fault-block $F_k$, the absolute value of a global cost function measuring the quality of the solution. For that purpose, in each fault-block, embodiments of the invention may generate horizons as level-set surfaces of an implicit horizon function $h(x,y,z)$.

BACKGROUND OF THE INVENTION

Geological horizons may include subsurface material deposited at a similar geological time (e.g., within a few thousand years). Current seismic exploration tools image models of geological horizons to survey the underground structures and search for oil and gas repositories.

Current modelling tools image horizons separately, one by one. Imaging horizons separately may cause problems, such as, 1) the horizon signal may be missing in some part of the volumes, 2) the internal layering or ordering of the rock layers between two horizons may be violated, and 3) many seismic events are not imaged while they carry significant (e.g., local) structural information, for example, because they may not be fully picked and therefore used in a traditional modelling approach.

SUMMARY OF THE INVENTION

Embodiments of the invention provide a system and method for modeling geological horizons in the subsurface by automatically generating a function $h(x,y,z)$ whose level-sets include all the possible geological horizons in the subsurface.

Embodiments of the invention provide a system and method for, in a computing system, generating a model function $h(x,y,z)$ representing geologic horizons. Geological data representing or related to a fault network and horizons, e.g., extracted from seismic data, (e.g., in a studied domain) may be received. A three-dimensional (3D) mesh may be generated covering the studied domain, wherein the 3D mesh may be divided into a plurality of fault blocks by the fault network. A discrete function $h(x,y,z)$ may be defined having values of the geological data representing horizons at discrete nodes of the 3D mesh. A constraint may be installed on the discrete function $h(x,y,z)$ defining surfaces representing horizons based on the geological data, for example including information imported and/or automatically extracted or filtered from seismic data, such as, a seismic cube or set of seismic lines. A constraint may be installed on the discrete function $h(x,y,z)$ to ensure the uniqueness of the function $h(x,y,z)$. The discrete function $h(x,y,z)$ may be interpolated at the nodes of the 3D mesh to create a piecewise continuous function $h(x,y,z)$ (e.g., continuous within each fault block) while honoring (e.g., satisfying) the constraints. The piecewise continuous horizon function $h(x,y,z)$ may be synchronized between different fault blocks, e.g., so that points associated with the same horizon in different fault blocks have the same horizon function $h(x,y,z)$ value. A model of the piecewise continuous horizon function $h(x,y,z)$ may be displayed.

The horizon function $h(x,y,z)$ may be generated or formed based on a discrete-smooth-interpolation (DSI) method and new DSI constraints.

BRIEF DESCRIPTION OF THE DRAWINGS

The principles and operation of the system, apparatus, and method according to embodiments of the present invention may be better understood with reference to the drawings, and the following description, it being understood that these drawings are given for illustrative purposes only and are not meant to be limiting.

Figure 1:
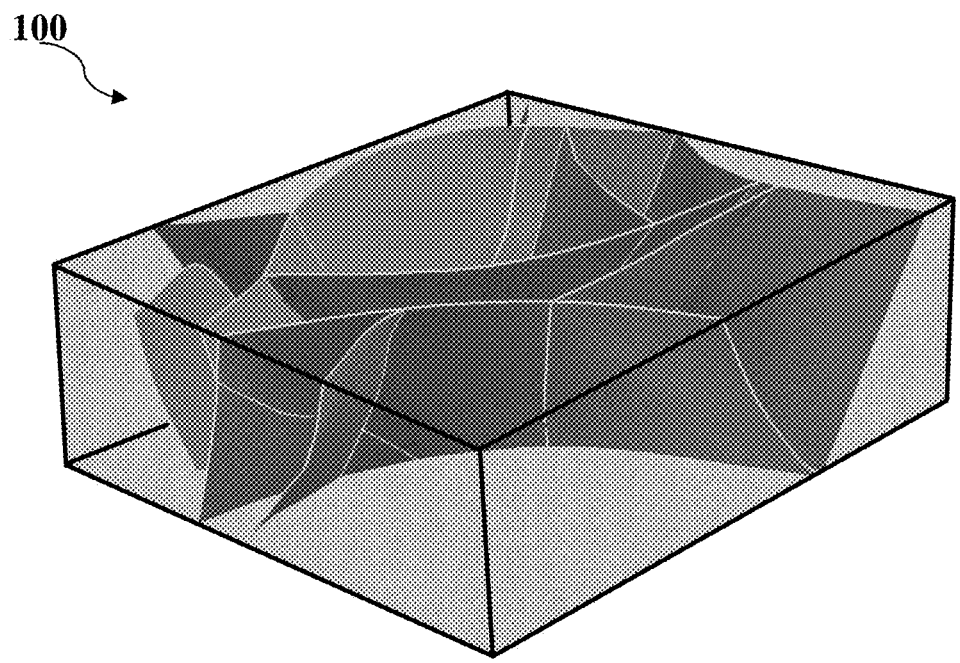
FIG. 1 is a schematic illustration of an example of a fault network, in accordance with embodiments of the invention.

For simplicity and clarity of illustration, elements shown in the drawings have not necessarily been drawn to scale. For example, the dimensions of some of the elements may be exaggerated relative to other elements for clarity. Further, where considered appropriate, reference numerals may be repeated among the drawings to indicate corresponding or analogous elements throughout the serial views.

DETAILED DESCRIPTION OF THE INVENTION

For the sake of clarity and for the purpose of simplifying the presentation of embodiments of the invention, the following preliminary definitions are given, although other definitions may be used:

Geological Horizon

A "geological horizon", or more simply, a "horizon" may refer to a model representation, e.g., denoted H=H(t), of a geological surface such as a set of particles deposited at a same geological-time (t) (e.g., within a similar time period of one to ten thousand years). In this definition of a horizon, H, the time of deposition (t) may be unknown. Horizons may be ordered according to their geological time (t), for example but not limited to, from relatively older horizons at a smaller geological time (t) coordinate to relatively younger horizons at a greater geological time (t) coordinate. Horizons may be extracted automatically from one or more "seed" or starting points and a seismic cube.

Reference and Virtual Horizons and Layers

A geological domain may be characterized by a series of "reference horizons" $\{H_1, H_2, \ldots H_n\}$, which may be separate geological layers with significantly distinct physical properties. The horizons may be automatically sorted so that each relatively deeper horizon $H_i$ is older than each relatively shallow horizon $H_{i+1}$. Each pair of adjacent horizons $H_i$ and $H_{i+1}$ may bound a common layer $L_i$.

Within each model layer $L_i$, any finite or infinite number of intermediate "virtual horizons" may be defined to split $L_i$ into smaller sub-layers that are approximately parallel to the bottom and top reference horizons $H_i$ and $H_{i+1}$.

Stratigraphic Column

A "Stratigraphic-Column" may refer to a list of reference horizons and associated layers sorted from relatively older to relatively younger geological-time of deposition. The stratigraphic column may also define the position of unconformities between sets of reference horizons.

Implicit Representation of Horizons

A function h(x,y,z) may be an implicit representation of all possible reference and virtual horizons in a studied domain (e.g., the region of space imaged or studied in a model, such as, a 3D volume) if the following properties hold for the function h(x,y,z):

h(x,y,z) may be a piecewise continuous function which is continuous within each fault block (e.g., continuous everywhere except across faults and unconformities).

The gradient of h(x,y,z) may not vanish, in other words, h(x,y,z) may be monotonic.

For any point on a "virtual" horizon, the function h(x,y,z) may have a constant value on that horizon.

There may be an unknown monotonic function T(h) such that the unknown geological-time of deposition t(x,y,z) of the particle of sediment observed today at location (x,y,z) is such that:

$$t(x,y,z)=T\{h(x,y,z)\}. \tag{1}$$

Embodiments of the invention include one or more processes to generate such a function h(x,y,z).

Level-Set-Surface

For any given point $(x_0,y_0,z_0)$ in the studied domain not located on a fault, the set of points (x,y,z) such that $h(x,y,z)=h(x_0,y_0,z_0)$ is called a "Level-Set-Surface". In the case where h(x,y,z) honors the constraints relative to the implicit representation of horizons presented above, each Level-Set-Surface may be considered a geologic horizon. In other words, for any given point in the studied domain not located on a fault, there is one unique horizon that intersects this point.

Two or more functions may be referred to as equivalent, for example, if the functions define or include the same level-set-surfaces. For example, two functions (e.g., h1(x,y,z) and h2(x,y,z)) are equivalent if there is a monotonic and strictly increasing or decreasing function F(h) such that:

$$h2(x,y,z)=F(h1(x,y,z)) \tag{1A}$$

A function h1(x,y,z) may be referred to as a "unique" function, e.g., if there exists only one such function or, alternatively, if there exist one or more additional equivalent functions h2(x,y,z) as defined by equation (1A). Equivalent horizon functions h1(x,y,z) and h2(x,y,z) may include the same level-set-surfaces.

Level-Set-Sampling

A Level-Set-sampling LS may include a set of sampling points $\{(x_1,y_1,z_1), (x_2,y_2,z_2), \ldots\}$ that may be located on the same horizon without requiring prior knowledge of the relative position of the associated horizons in the Stratigraphic-Column. In other words, a Level-Set-Sampling LS is characterized by the following property for any pair of points $\{(x_i, y_i,z_i),(x_j, y_j,z_j)\}$ belonging to LS:

$$h(x_i,y_i,z_i)=h(x_j,y_j,z_j) \text{ for all } i \& j \tag{2}$$

In equation (2), the actual values of $h(x_i,y_i,z_i)$ and $h(x_j,y_j,z_j)$ need not be known.

Bubbles

Assume that the horizons in studied geological domain may be defined implicitly by a monotonic function, h(x,y,z). If the gradient of the horizon function h(x,y,z) does not vanish within the studied domain, then each Level-Set of the horizon function h(x,y,z) may be an open surface and may thus be considered as a valid horizon.

Conversely, if the gradient of the horizon function h(x,y,z) does vanish at a location $(x_0,y_0,z_0)$ within the studied domain, then there is a closed Level-Set-Surface called a "bubble" surrounding the vanishing point $(x_0,y_0,z_0)$. From a geological perspective, such a bubble may not represent a valid horizon. Therefore, the horizon function h(x,y,z) may be locally modified so that the gradient of the horizon function h(x,y,z) does not vanish or, equivalently, that the horizon function h(x,y,z) has no local minimum or maximum value in the studied domain.

Fault and Unconformity

In stratified layers, faults and unconformities may be curvilinear surfaces which may be for example characterized as follows.

A fault may be a surface of discontinuity of the horizons that may have been induced by a relative displacement of terrains on both sides of such surfaces. As a consequence, horizons may be discontinuous across each fault. Faults may cut horizons and may also cut other faults.

An unconformity may be a surface of discontinuity of the horizons that may have been induced by for example an erosion of old terrains replaced by new ones. In other words, similarly to faults, unconformities may induce discontinuities of the horizons.

When discussed herein, unconformities may be treated as faults, such that, when used herein, faults may include both real faults and unconformities. If horizons in studied geological domain are defined implicitly by a monotonic function h(x,y,z), then this function is continuous everywhere except across faults.

The whole set of fault surfaces may be referred to as a "Fault-Network". Reference is made to FIG. 1, which schematically illustrates an example of a fault network 100, in accordance with embodiments of the invention.

Fault-Block

For a set of discontinuities in the subsurface represented by a network of fault surfaces, a "Fault-Block" may refer to any connected part of the subsurface. In other words, a region $F_k$ in the subsurface may refer to a Fault-Block if (and only if), for any pair of points $(x_0,y_0,z_0)$ and $(x_1,y_1,z_1)$ in $F_k$ there is a continuous path joining these two points without crossing any fault surface nor crossing the boundaries of the studied domain. The fault blocks may be generated or formed for example by cutting, dividing or forming cell faces along the fault lines of the fault network.

Figure 2A:
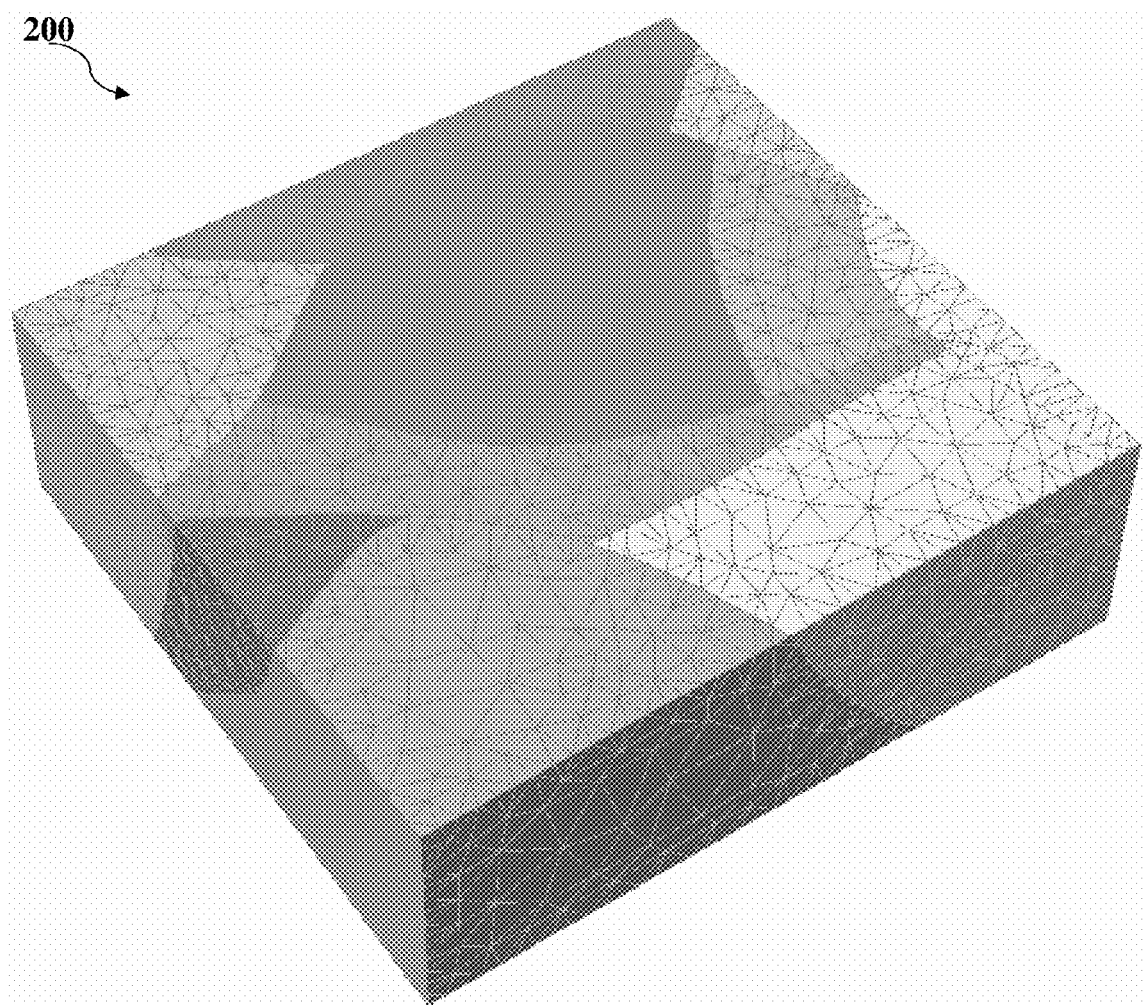
FIG. 2A is a schematic illustration of an example of fault blocks, in accordance with embodiments of the invention.

Reference is made to FIG. 2A, which schematically illustrates an example of fault blocks 200, for example, induced by the fault network of FIG. 1, in accordance with embodiments of the invention. Each fault block is painted as a different grey level in FIG. 2A to differentiate fault blocks 200.

Fault Style Constraints

Figure 2B:
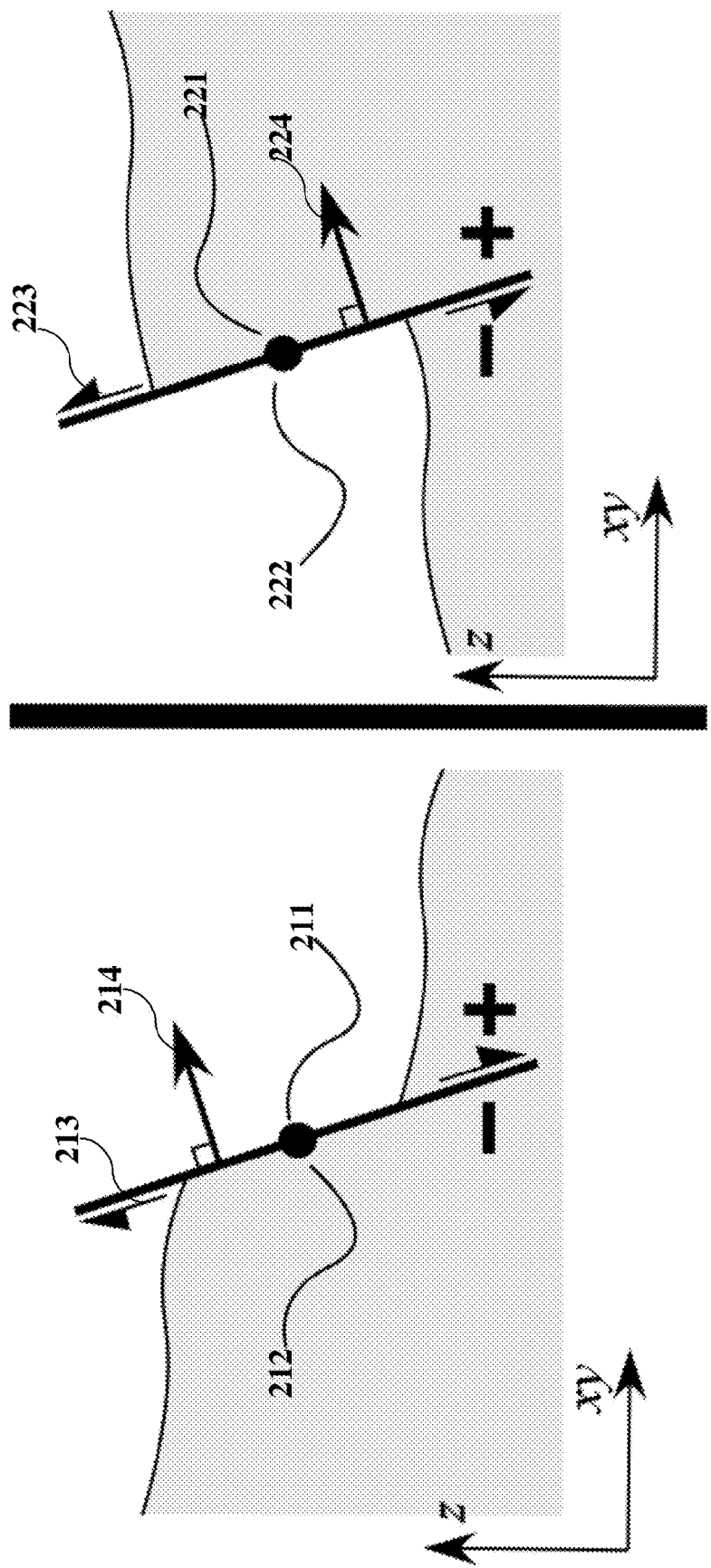
FIG. 2B is a schematic illustration of a normal fault and a reverse fault, in accordance with embodiments of the invention.

Reference is made to FIG. 2B, which schematically illustrates a normal fault (e.g., left-side diagram) and a reverse fault (e.g., right-side diagram), in accordance with embodiments of the invention. As shown in FIG. 2B, vector $N_F$ 214 (resp. 224) may be an average unit normal vector orthogonal to a non-vertical fault 213 (resp. 223). The orientation of average normal vector $N_F$ 214 (resp. 224) may be chosen so that the vertical component of vector $N_F$ 214 is, for example, positive. Average normal vector $N_F$ 214 may define a polarity on fault 213 (resp. 223), for example, from a negative to a positive side of fault 213 in the direction defined by average normal vector $N_F$ 214.

Any pair of collocated points may include a point $(x_+,y_+,z_+)$ 211 (resp. 221) and a point $(x_-,y_-,z_-)$ 212 (resp. 222) on fault 213 (resp. 223) laying on the positive and negative sides of the fault, respectively. If the horizon function h(x,y,z) is an increasing function of the (unknown) geological time, for example, in structural geology:

Fault 213 may be referred to as a "normal" fault if the following constraint is honored:

$$h(x_-,y_-,z_-)-h(x_+,y_+,z_+)<0 \quad (2N)$$

Fault 223 may be referred to as a "reverse" fault if the following constraint is honored:

$$h(x_+,y_+,z_+)-h(x_-,y_-,z_-)<0 \quad (2R)$$

Therefore, to take into account the tectonic style of a non-vertical fault 213 (resp. 223), for each pair of sampling points 212 and 211 (resp. 222 and 221) collocated on fault 213 (resp. 223), one of these inequality constraints (2N) or (2R) may be honored by the horizon function h(x,y,z) regardless of the geometry of the horizons and the fault. The style of a non-vertical fault 213 (resp. 223) may be decided automatically or by a structural geologist or other user.

Mesh M

In one embodiment, the studied geological domain may be covered with or spanned by a 3D mesh M including a set of adjacent 3D cells such that, for example:

Each cell is a polyhedron bounded by polyhedral facets (faces).

Each polyhedral facet of a cell is bounded by edges joining vertices or points called "nodes".

Cells may share only nodes, edges and polyhedral facets.

Each node $n_i=n(x_i,y_i,z_i)$ may be characterized by its location $(x_i,y_i,z_i)$ and/or the set of adjacent nodes linked to the node $n_i$ by an edge.

If two nodes assigned to each face of a fault surface are collocated, then they may not be linked by an edge. This condition may be used to model the discontinuities induced in the subsurface by the fault network. Therefore, two nodes $n_i$ and $n_k$ collocated on both sides of a fault may hold different values for the function h(x,y,z).

Each cell may be discrete, e.g., defining the function at discrete points, such as, the nodes or vertices and/or sampling points within the cell, or alternatively may be continuous, defining the function at all points in the continuous range within the cell boundaries.

Figure 3:
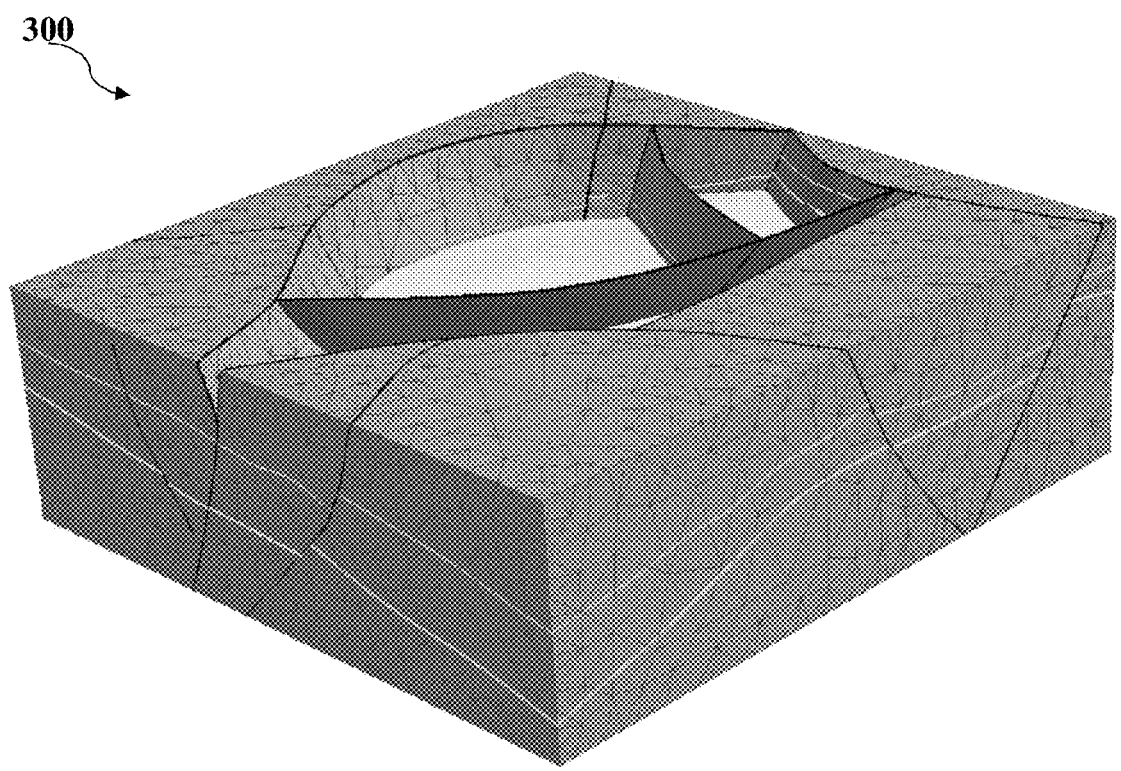
FIG. 3 is a schematic illustration of an example of a 3D mesh, in accordance with embodiments of the invention.

Reference is made to FIG. 3, which schematically illustrates an example of a 3D mesh 300 including a set of cells, in accordance with embodiments of the invention. In the example of FIG. 3, the cells of mesh 300 include tetrahedra, although any other polyhedra may be used, such as, hexahedra. The cells may all have the same number of sides or some cells may have different numbers of sides. Each Fault-Block is painted as a different grey level in FIG. 3.

Discrete Function

A "discrete function" may refer to any function h(x,y,z) defined by its values $h(n_i)=h\{n(x_i,y_i,z_i)\}$ at each node $(n_i)$ of a 3D mesh M. A local interpolator may be used to interpolate a discrete function h(x,y,z) within each cell of the mesh M so that h(x,y,z) is continuous everywhere except across faults.

If two collocated nodes $(n_j, n_i)$ are collocated at location $(x_j,y_j,z_j)=(x_i,y_i,z_i)$ and assigned to each side of a fault, then two distinct values of the discrete function $h(n_j)=h\{n(x_j,y_j,z_j)\}$ and $h(n_i)=h\{n(x_i,y_i,z_i)\}$ may be assigned to that location. Discontinuities of the function h(x,y,z) across faults may be modeled as points of the discrete function having two or more distinct values.

Any point (x,y,z) in the studied domain may belong to a cell K of the mesh M whose vertices correspond to nodes $\{n_{k1}, n_{k2}, \ldots\}$ of the mesh M. For any discrete function defined on M, a value of the discrete function h(x,y,z) may be interpolated that includes a linear combination of the values of $h(n)=h\{n(x,y,z)\}$ at the vertices of the cell K, for example, as follows:

$$h(x,y,z)=A(x,y,z|n_{k1}) \cdot h(n_{k1})+A(x,y,z|n_{k2}) \cdot h(n_{k2})+ \quad (3)$$

In equation (3), each coefficient $A(x,y,z|n_k)$ may depend only on the geometry of the cell K, the coordinates $(x_k,y_k,z_k)$ of the node $n_k$ of K and the coordinates (x,y,z) of the point where h(x,y,z) is evaluated. In some embodiments, $A(x,y,z|n_k)$ may not depend on the function h(x,y,z) itself.

The partial derivative of the discrete function $h(x,y,z)$ may be deduced from equation (3), for example, as follows:

$$dh(x,y,z)/dx = dA(x,y,z|n_{k1})/dx \cdot h(n_{k1}) + dA(x,y,z|n_{k2})/dx \cdot h(n_{k2}) + \ldots$$

$$dh(x,y,z)/dy = dA(x,y,z|n_{k1})/dy \cdot h(n_{k1}) + dA(x,y,z|n_{k2})/dy \cdot h(n_{k2}) + \ldots$$

$$dh(x,y,z)/dz = dA(x,y,z|n_{k1})/dz \cdot h(n_{k1}) + dA(x,y,z|n_{k2})/dz \cdot h(n_{k2}) + \ldots \quad (4)$$

Discrete-Smooth-Interpolation (DSI)

A discrete function $h(x,y,z)$ may be defined by its values $h(n_i) = h(x_i, y_i, z_i)$ at the nodes $\{n_1, n_2, \ldots, n_i, \ldots, n_N\}$ of a mesh, M. Discrete-Smooth-Interpolation (DSI) may approximate values of the discrete function at the nodes $\{h(n_1), h(n_2), \ldots, h(n_i), \ldots, h(n_N)\}$ while honoring a given set of linear constraints $C = \{c1, c2, \ldots\}$ related to the discrete function $h(x,y,z)$. Each linear constraint "c" in the set of constraints C may be defined by a set $\{bc, Ac(n_1), Ac(n_2), \ldots, Ac(n_i), \ldots, Ac(n_N),\}$ of (N+1) given coefficients and may include the following linear combination of the values of the discrete function $h(x,y,z)$ at the N nodes of mesh M, for example, as follows:

$$Ac(n_1) \cdot h(n_1) + Ac(n_2) \cdot h(n_2) + \ldots + Ac(n_N) \cdot h(n_N) = bc \quad (5)$$

DSI constraints may be classified as one or more of the following types (although other types may be used):

A "Soft" constraint may cause the function $h(x,y,z)$ to approximately honor this constraint, for example, using a least square approximation.

A "Hard" constraint may cause the function $h(x,y,z)$ is to strictly honor this constraint, for example, using an exact equivalence.

A "Smoothness" constraint may cause the function $h(x,y,z)$ to vary as smoothly as possible while still honoring the other soft and hard constraints. For example, a smoothness constraint may be a soft constraint specifying that, for any pair of topologically adjacent cells (K1,K2) of the mesh M, the gradient of the function $h(x,y,z)$ within the cells K1 and K2 may be approximately equal, for example, using a least square approximation.

A non-empty set $C = \{c_1, c_2, \ldots, c_m\}$ of soft constraints may be defined, e.g., according to equation (5), by a system of linear equations, which may be solved to minimize a global quadratic least square criterion, such as, $J(h(n_1), \ldots, h(n_N))$. The system of linear equations may be, for example:

$$Ac_1(n_1) \cdot h(n_1) + Ac_1(n_2) \cdot h(n_2) + \ldots + Ac_1(n_N) \cdot h(n_N) = bc_1 \quad (6)$$

$$Ac_2(n_1) \cdot h(n_1) + Ac_2(n_2) \cdot h(n_2) + \ldots + Ac_2(n_N) \cdot h(n_N) = bc2$$

$$\ldots$$

$$Ac_k(n_1) \cdot h(n_1) + Ac_k(n_2) \cdot h(n_2) + \ldots + Ac_k(n_N) \cdot h(n_N) = bc_k$$

$$\ldots$$

$$Ac_m(n_1) \cdot h(n_1) + Ac_m(n_2) \cdot h(n_2) + \ldots + Ac_m(n_N) \cdot h(n_N) = bc_m$$

The DSI method may generate a solution $\{h(n_1), \ldots, h(n_N)\}$ to the system of linear equations, such that, $J(h(n_1), \ldots, h(n_N))$ is minimized subject to honoring any hard constraints.

Constraints, such as, DSI constraints, may be "installed" on the function $h(x,y,z)$. Installing may include adding the constraint as a condition on the function $h(x,y,z)$. That is, installing a constraint may modify the function so that the function satisfies or "honors" the constraint condition(s). Constraints may be installed by entering or selecting constraints into a constraint input field in a DSI or other modeler. Alternatively or additionally, a user may modify the model and a corresponding constraint may be automatically generated or formed to ensure the modification.

In practice, the DSI method may simultaneously take into account a huge amount of constraints of many different types and may generate one unique solution.

Examples of DSI Constraints

Examples of DSI constraints may include, for example:

A "Control-Node" constraint may define that, at a given node $n_0$, the value $h(n_0)$ is equal to a given value $h_0$. According to equation (5), all the coefficients Ac may vanish, e.g., except the coefficient corresponding to the node $n_0$. The control-node constraint may be written, for example, as follows:

$$Ac(n_0) \cdot h(n_0) = bc = h_0 \quad (7)$$

A "Control-Point" constraint may define that, at a given location $(x_0, y_0, z_0)$ within a given cell K, the value of $h(x_0, y_0, z_0)$ is equal to a given value $h_0$. According to equations (3) and (5), all the coefficients Ac may vanish except those corresponding to the vertices $\{n_{k1}, n_{k2}, \ldots\}$ of the cell K. The control-point constraint may be written, for example, as follows:

$$A(x_0, y_0, z_0|n_{k1}) \cdot h(n_{k1}) + A(x_0, y_0, z_0|n_{k2}) \cdot h(n_{k2}) + \ldots = bc = h_0 \quad (8)$$

A "Control-Gradient" constraint may define that, at a given location $(x_0, y_0, z_0)$ within a given cell K, the gradient of $h(x_0, y_0, z_0)$ is equal to a given vector $G_0$ with components $(G_{0x}, G_{0y}, G_{0z})$. According to equations (4) and (5), all the coefficients Ac may vanish except those corresponding to the vertices $\{n_{k1}, n_{k2}, \ldots\}$ of the cell K. The control-gradient constraint may be written, for example, as the following three independent DSI constraints:

$$dA(x_0, y_0, z_0|n_{k1})/dx \cdot h(n_{k1}) + dA(x_0, y_0, z_0|n_{k2})/dx \cdot h(n_{k2}) + \ldots = bc_x = G_{0x}$$

$$dA(x_0, y_0, z_0|n_{k1})/dy \cdot h(n_{k1}) + dA(x_0, y_0, z_0|n_{k2})/dy \cdot h(n_{k2}) + \ldots = bc_y = G_{0y}$$

$$dA(x_0, y_0, z_0|n_{k1})/dz \cdot h(n_{k1}) + dA(x_0, y_0, z_0|n_{k2})/dz \cdot h(n_{k2}) + \ldots = bc_z = G_{0z} \quad (9)$$

A "Delta" equality constraint may define that, given two points $(x_0, y_0, z_0)$ and $(x_1, y_1, z_1)$ within two possibly distinct cells K and H, the difference of the horizon function at those points $\{h(x_0, y_0, z_0) - h(x_1, y_1, z_1)\}$ may be equal to a given value $D_{01}$. According to equations (3) and (5), all the coefficients Ac may vanish except those corresponding to the vertices $\{n_{k1}, n_{k2}, \ldots\}$ and $\{n_{h1}, n_{h2}, \ldots\}$ of the cells K and H. The delta constraint may be written, for example, as follows:

$$A(x_0, y_0, z_0|n_{k1}) \cdot h(n_{k1}) + A(x_0, y_0, z_0|n_{k2}) \cdot h(n_{k2}) + \ldots$$

$$-A(x_1, y_1, z_1|n_{h1}) \cdot h(n_{h1}) - A(n_{h2}) \cdot h(n_{h2}) - \ldots = bc = D_{01} \quad (10A)$$

A "Delta" inequality constraint may define that, given two locations $(x_0, y_0, z_0)$ and $(x_1, y_1, z_1)$ within two possibly distinct cells K and H, the difference of the horizon function at those points $\{h(x_0, y_0, z_0) - h(x_1, y_1, z_1)\}$ may be less than or equal to a given value $D_{01}$. According to equations (3) and (5), all the coefficients Ac may vanish except those corresponding to the vertices $\{n_{k1},$ $n_{k2}, \ldots\}$ and $\{n_{h1}, n_{h2}, \ldots\}$ of the cells K and H. The delta constraint may be written, for example, as follows:

$$A(x_0,y_0,z_0|n_{k1}) \cdot h(n_{k1}) + A(x_0,y_0,z_0|n_{k2}) \cdot h(n_{k2}) + \ldots$$

$$-A(x_1,y_1,z_1|n_{h1}) \cdot h(n_{h1}) - A(n_{h2}) \cdot h(n_{h2}) - \ldots < bc = D_{01} \quad (10B)$$

The "Constant-Gradient" soft constraint may define that, given two adjacent cells $K_i$ and $K_j$ sharing common nodes of the mesh M as vertices, the gradients in these adjacent cells may be approximately equal, for example, using a least square approximation. Due to the linearity of the gradient, the constant-gradient soft constraint may be a generalization of the control-gradient constraint described above.

Seismic Cube

In the geophysical and geologic study of the subsurface, a seismic survey may launch seismic waves in the subsurface and record the echo of the signals as they are reflected by the geological structures and returned back to the Earth's surface. After seismic processing, a seismic-trace observed along a vertical axis at each sampling location $(x_i,y_i)$ may be obtained, which may be defined by a function $A(T|x_i,y_i)$ representing the amplitude of the echoed seismic signal recorded after a seismic-time lag (T) at location $(x_i,y_i)$. In practice, the seismic-time (T) may be transformed into a depth or a vertical coordinate. When used herein, the (z) or depth axis may represent a seismic-time, an altitude or a depth.

Seismic-traces recorded at nodes $(x_i,y_i)$ of a two-dimensional (2D) horizontal regular array and accumulated over a 3D volume in the 3D studied domain may be referred to as a "Seismic-cube". Seismic-traces may include seismic data used to automatically generate or extract geological data related to horizons, such as, nodes, points, horizons and cells.

Using a Seismic Cube to Characterize Geological Structures

Figure 4:
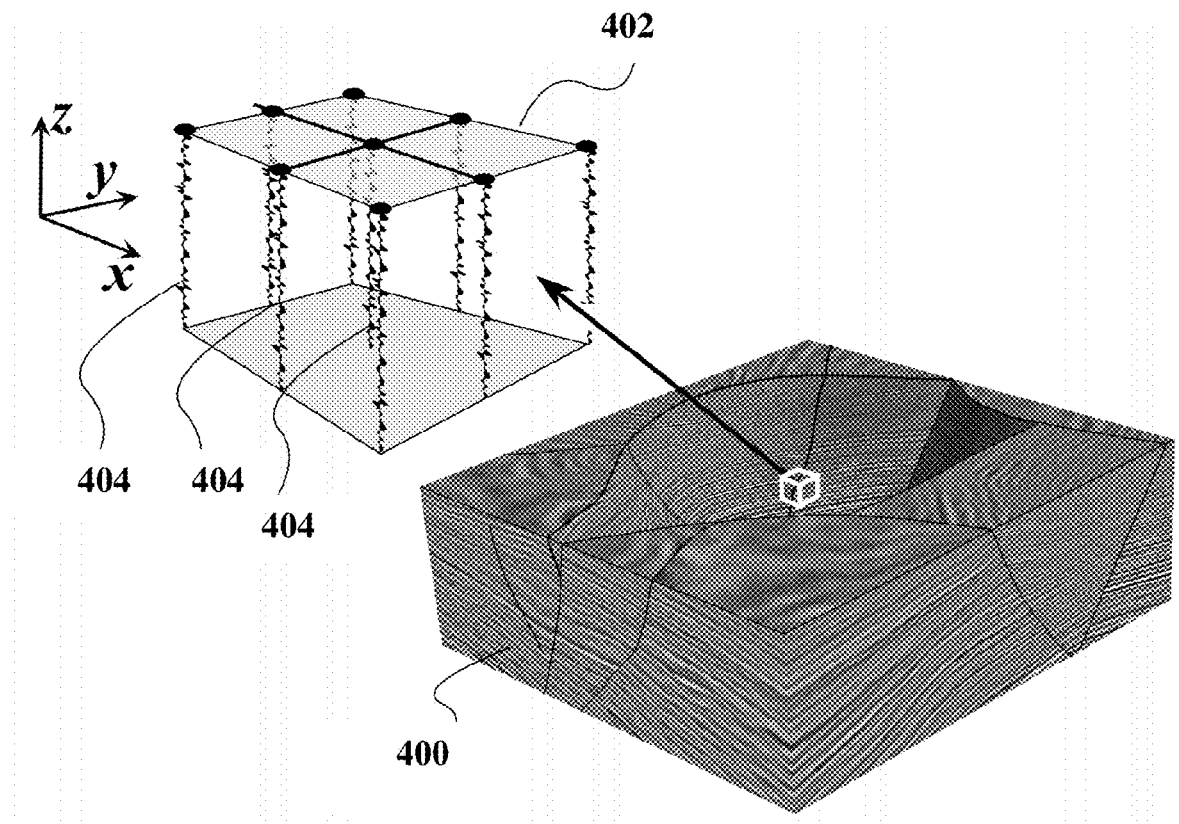
FIG. 4 is a schematic illustration of an example of a seismic cube, in accordance with embodiments of the invention.

Reference is made to FIG. 4, which schematically illustrates an example of a seismic cube 400, in accordance with embodiments of the invention. In the example of FIG. 4, a region of seismic cube 400 corresponding to a central fault block is made transparent for the sake of clarity.

Seismic cube 400 may include a plurality of "tracelets" 404 neighboring a center point (x,y,z). A "tracelet" 404 may refer to any part of a seismic-trace $A(T|x_i,y_i)$. Each tracelet 404 in a box B(x,y,z) 402 may be compared with tracelets which are the closest to the center point (x,y,z) to select (or not) a set BP(x,y,z) including "seed" points (e.g., seed points 502 of FIG. 5) which best correlate with the center point (x,y,z). Each seed point within BP(x,y,z) may be assumed to be located on the same virtual horizon as the one passing through center point (x,y,z). Moreover, each tracelet in box B(x,y,z) 402 may belong to the same fault block. Each seed point may be selected manually (e.g., in FIG. 5) or automatically (e.g., in FIG. 6) and may be automatically adjusted, for example, to the nearest amplitude maximum, minimum or zero crossing. Geological data, such as level set samplings (e.g., level set sampling horizons 702 of FIG. 7), related to horizon may be extracted from seismic cube 400 and the set BP(x,y,z) of seed points. In another embodiment, the geological data may be received from an external or other source.

Figure 5:
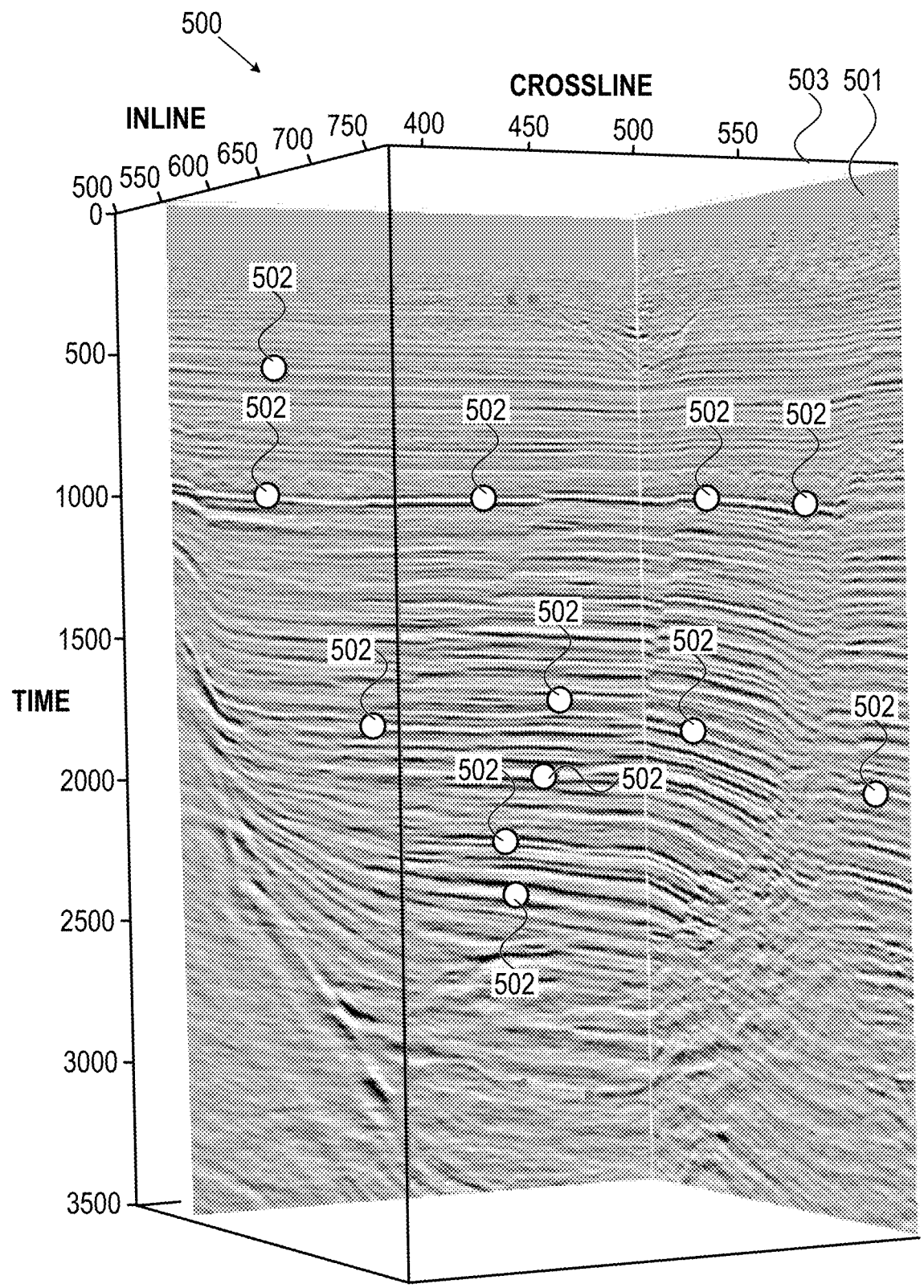
FIG. 5 is a schematic illustration of an example model including a plurality of seed points, for example, selected manually, in accordance with embodiments of the invention.

Reference is made to FIG. 5, which schematically illustrates an example model 500 including a plurality of seed points 502, for example, selected manually, in accordance with embodiments of the invention.

Figure 6A:
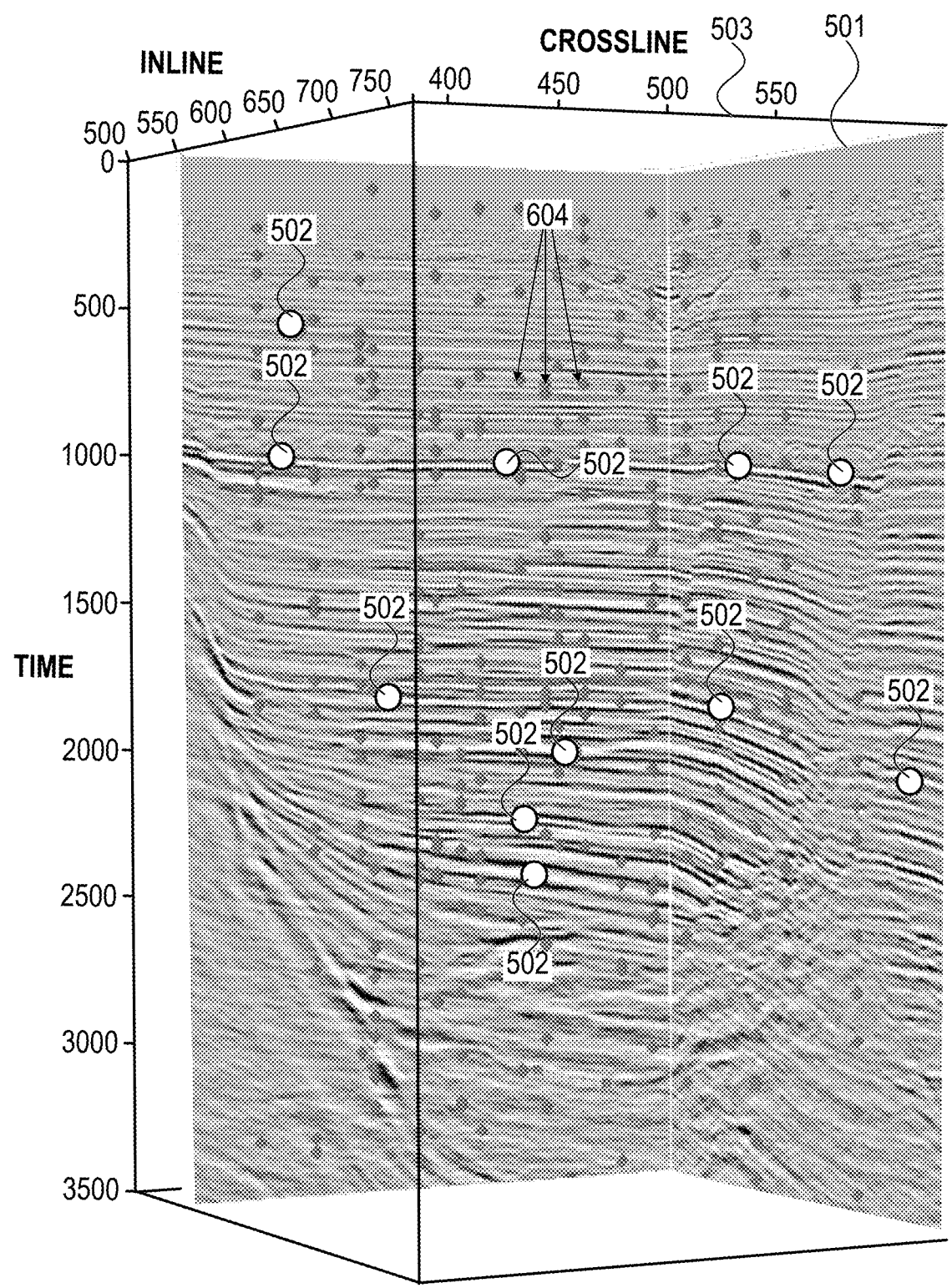
FIGS. 6A and 6B are schematic illustrations of perspective and top views of an example model including a plurality of seed points, for example, selected automatically, in accordance with embodiments of the invention.
Figure 6B:
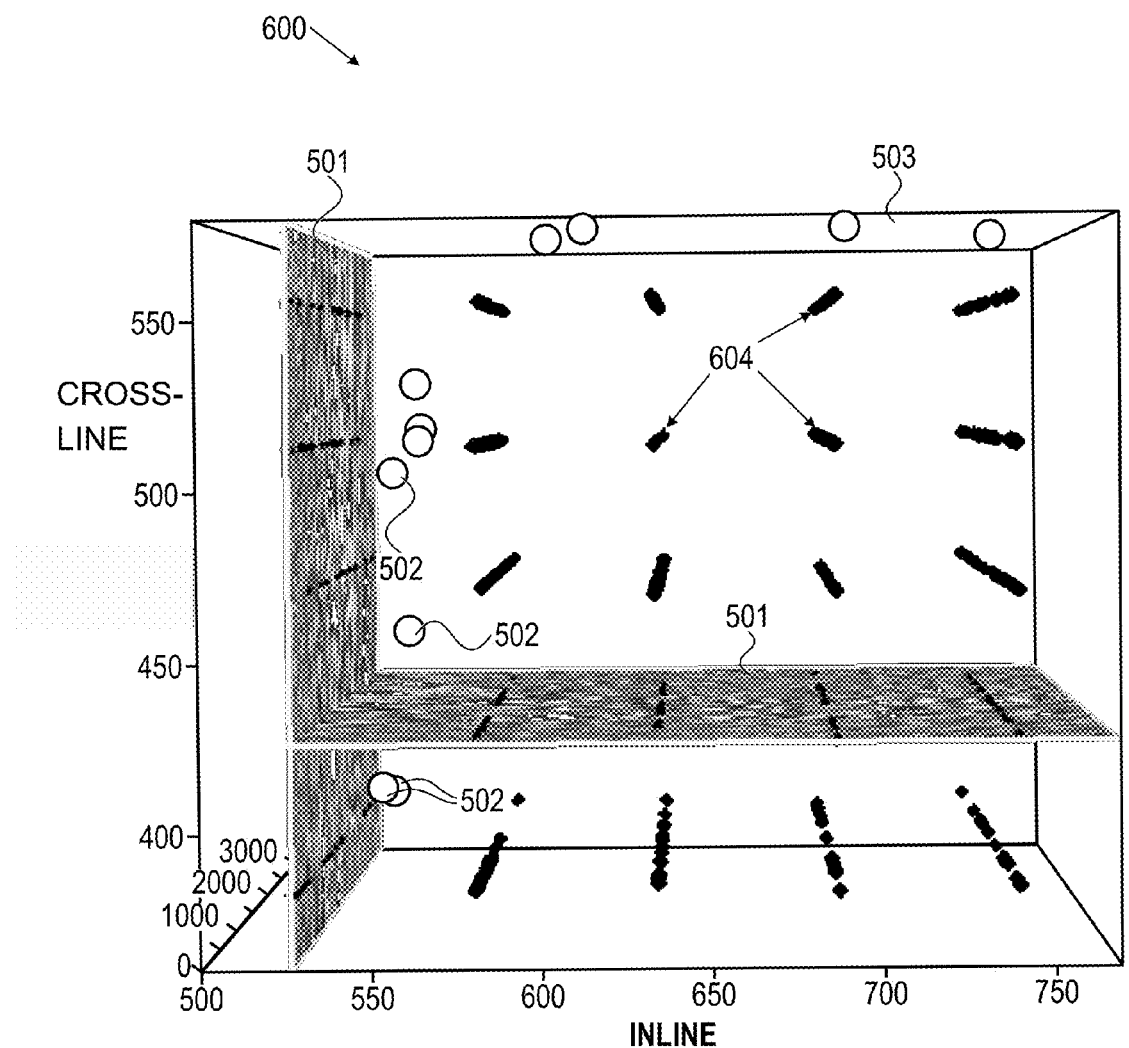

Reference is made to FIGS. 6A and 6B, which schematically illustrate perspective and top views of an example model 600 including a plurality of seed points 604, for example, selected automatically, in accordance with embodiments of the invention.

Starting from given initial seed point(s) 502 or 604 $(x_0,y_0,z_0)$, an auto-picking mechanism may automatically generate a set of sampling points (e.g., sampling points 702 of FIG. 7) that are located on the same horizon as the initial seed point $(x_0,y_0,z_0)$. The set of sampling points 702 may be extracted recursively from an initial box Bi(x,y,z) 402 to a neighboring box Bi+1(x,y,z).

Figure 7:
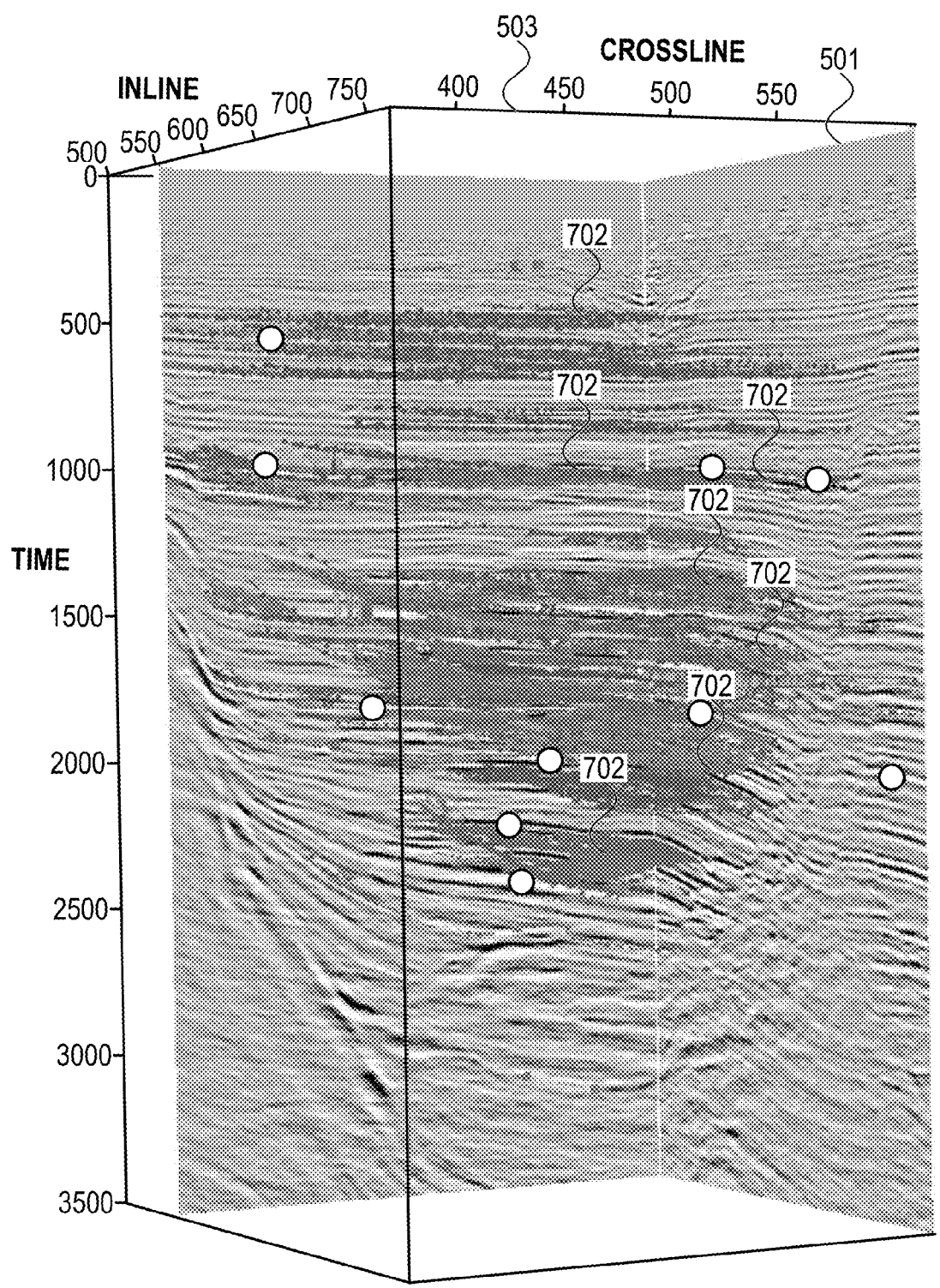
FIG. 7 is a schematic illustration of horizons automatically extracted from the seismic cube of FIG. 4 and the seed points of FIGS. 6A and 6B, in accordance with embodiments of the invention.
Figure 8:
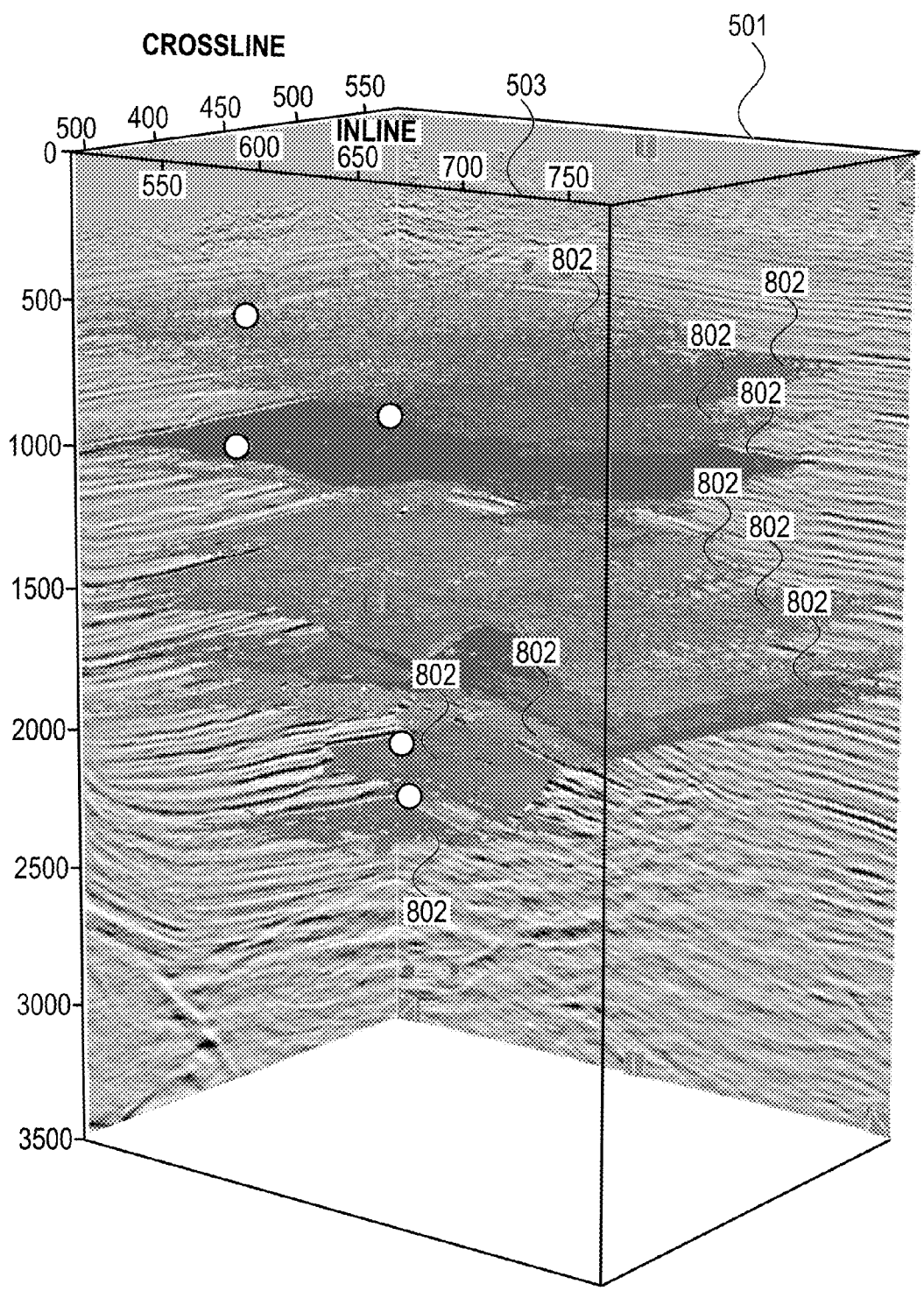
FIG. 8 is a schematic illustration of horizons generated by merging the horizons of FIG. 7, in accordance with embodiments of the invention.
Figure 9:
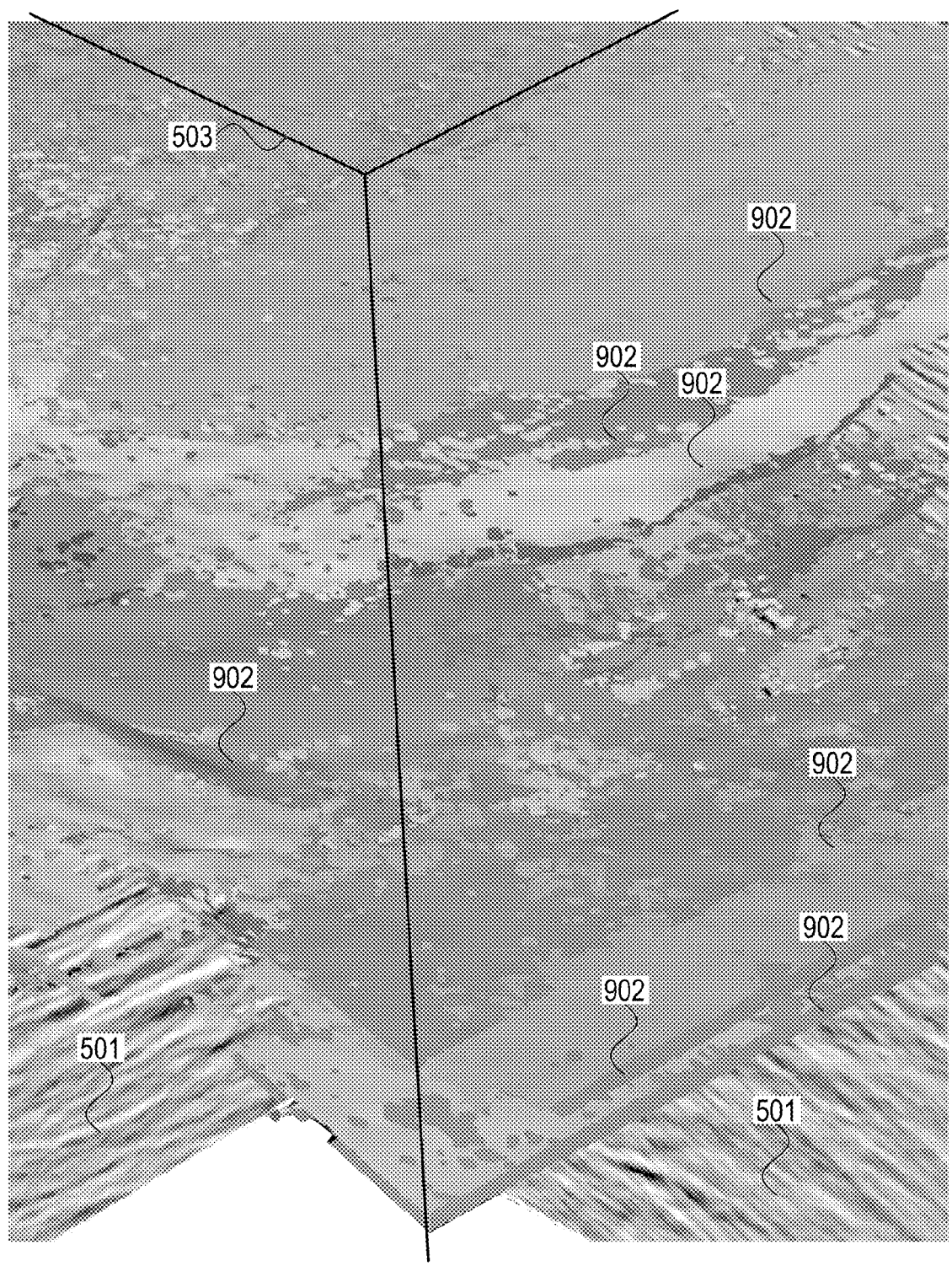
FIG. 9 is a schematic illustration of horizons generated by smoothing the merged horizons of FIG. 8, in accordance with embodiments of the invention.

Reference is made to FIGS. 7-9, which schematically illustrate horizons 702, 802 and 902 or level set samplings automatically extracted from seismic data (e.g. seismic data 501 of seismic cube 503 of FIG. 5 or seismic cube 400 of FIG. 4) and/or seed points (e.g., seed points 502 of FIG. 5 and/or 604 of FIGS. 6A and 6B), in accordance with embodiments of the invention.

The dip and azimuth values of horizons 702, 802 and/or 902 may be generated using vectors orthogonal to the horizons. (A vector may refer to a model object defining a direction and length, although the length may be a trivial unit length of a unit vector.) Provided that the subset of sampling points 702 BP$(x_0,y_0,z_0)$ includes at least three non-collinear points, a plane may be generated that intersects these points. The unit normal vector N$(x_0,y_0,z_0)$ of plane or, equivalently, the dip and azimuth of this vector, may be determined and used to model horizons 702, 802 and/or 902.

In FIG. 7, horizons or horizon patches 702 may be generated or extracted from seed points 502/604. For example, seed points 502/604 may be grouped and/or extrapolated to generate horizons 702. In the example of FIG. 7, approximately 70-200 horizons patches are automatically extracted. In FIG. 8, the horizons of FIG. 7 may be merged or combined to generate horizons 802. In the example of FIG. 8, merging the approximately 70-200 horizons patches of FIG. 7 generates approximately 30-50 remaining horizons patches. In FIG. 9, the horizons of FIG. 8 may be filtered or refined, e.g., by removing discontinuities (e.g., spikes, bumps, creases, etc.) and smoothing the horizons to generate more continuous horizons 902.

Figure 10:
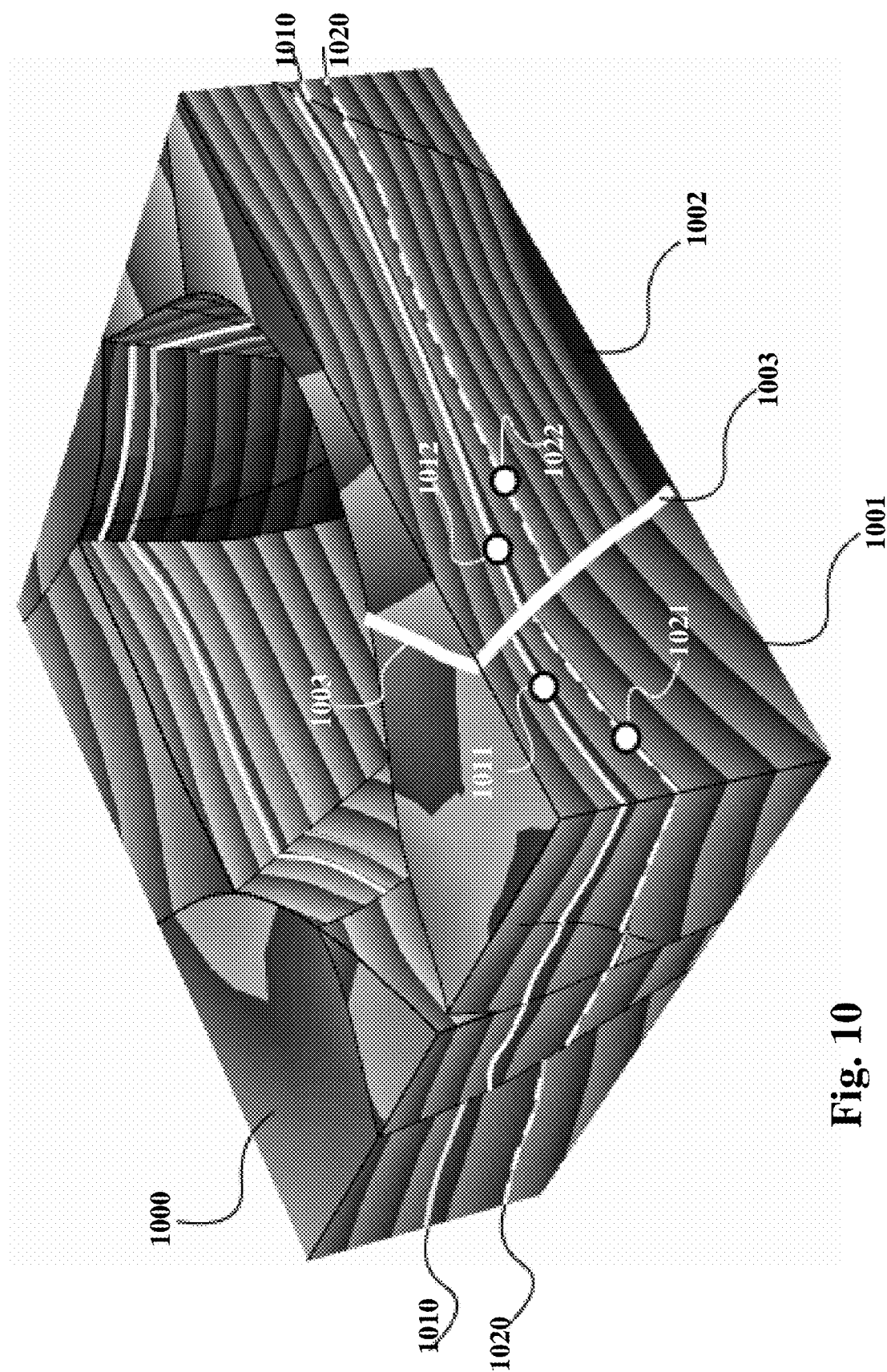
FIG. 10 is a schematic illustration of an implicit horizon function, in accordance with embodiments of the invention.
Figure 11:
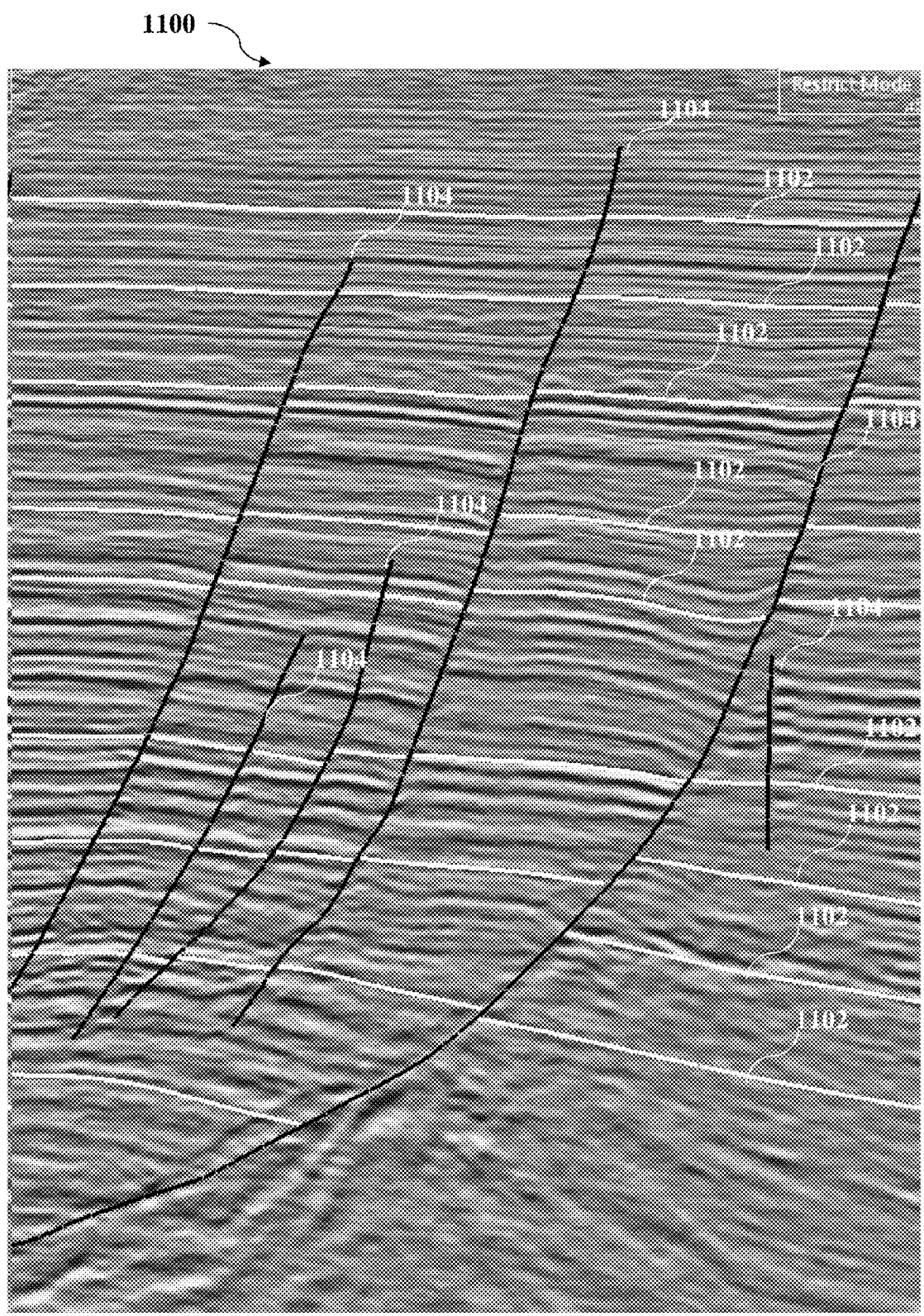
FIG. 11 is a schematic illustration of a two-dimensional (2D) example model of horizons implicitly defined by the horizon function of FIG. 10, in accordance with embodiments of the invention.
Figure 12:
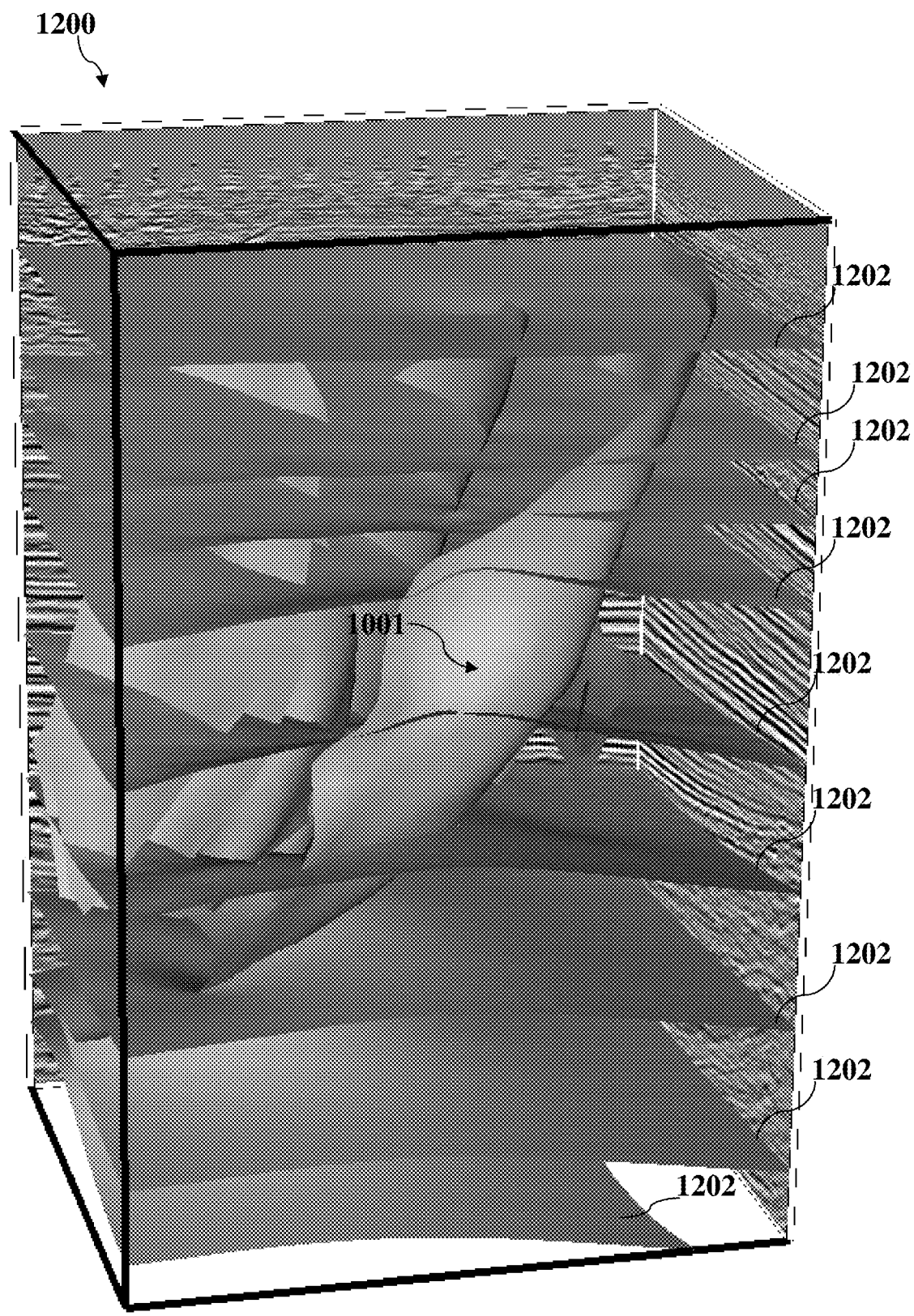
FIG. 12 is a schematic illustration of a three-dimensional (3D) example model of horizons implicitly defined by the horizon function of FIG. 10, in accordance with embodiments of the invention.

Embodiments of the invention propose a system and method to generate a implicit function h(x,y,z), for example, as described in reference to FIG. 10, whose level-sets represent horizons in a subsurface structure, for example, as described in reference to FIGS. 11 and 12. The horizon function h(x,y,z) may be generated based on for example the DSI method and new DSI constraints designed to automatically construct such a function h(x,y,z).

According to embodiments of the invention, by not restricting the information used to build the model to a set of well-defined horizons, but by using the seismic image where it represents coherent events, the model horizon function h(x,y,z) may honor traditional reference horizons as well as internal layer stratigraphy as seen on seismic events. In addition, horizon auto-picking may be executed fully automatically for all events of significant coherence.

Reference is made to FIG. 10, which schematically illustrates an implicit horizon function 1000, in accordance with embodiments of the invention. Level set surfaces 1010 and 1020 or iso-surfaces of implicit horizon function 1000 (e.g., surfaces having the same function 1000 value) may implicitly define horizons (e.g., horizons 1102 of FIG. 11 and 1202 of FIG. 12). Level set surfaces 1010 and 1020 may cross a set of adjacent fault blocks 1001 and 1002 separated by fault surfaces $F_{ks}$ 1003. Periodic gray scale color map variations may represent variations of the horizon functions.

Reference is made to FIGS. 11 and 12, which schematically illustrate example models 1100 and 1200 of horizons 1102 and 1202, respectively, implicitly defined by the horizon function h(x,y,z) of FIG. 10, in accordance with embodiments of the invention. Model 1100 shows a 2D representation of horizons and model 1200 shows a 3D representation of horizons.

Model(s) 1100 and/or 1200 may be generated implicitly by a horizon function h(x,y,z) (e.g., implicit horizon function 1000 of FIG. 10) and a fault network 1104 (e.g., fault network 100 of FIG. 1). The implicit horizon function h(x,y,z) may represent all horizons 1102 and 1202 in models 1100 and 1200, respectively, so that all horizons may be generated and edited simultaneously in each model.

In each model 1100 and/or 1200, horizons 1102 or 1202 may be organized according to their geological time. Model(s) 1100 and/or 1200 may be generated by applying the geological-time function (t) (e.g., monotonically) to the implicit horizon function h(x,y,z) 1000, such that t(x,y,z)=T{h(x,y,z)}. Moreover, by graphically co-rendering seismic data with level sets 1010 and 1020 of implicit horizon function h(x,y,z) 1000 on cross sections, the quality of the implicit horizon function h(x,y,z) 1000 may be visually controlled.

Model(s) 1100 and/or 1200 may be generated, for example, according to the following operations, each step described in more detail below (other operations or series of operations may be used in different embodiments):

1. Import or receive seismic data (e.g. seismic cube 400 of FIG. 4).
2. Import a fault network (e.g., fault network 100 of FIG. 1 and/or fault network 1104 of FIG. 11).
3. Import or generate a series of seed points (e.g., seed points 502 of FIG. 5 or 604 of FIGS. 6A and 6B) and/or a series of normal-direction constraints orthogonal to the horizons.
4. Automatically extract geological data related to horizons, such as, a series of level-set-samplings (e.g., sampling points 702 of FIG. 7) and/or a series of normal-direction constraints.
5. Edit the level-set-samplings (e.g., to generate edited horizons or sampling points 802 of FIG. 8 and 902 of FIG. 9).
6. Build a 3D mesh M (e.g., mesh 300 of FIG. 3) covering the studied domain and dividing the mesh into a plurality of fault blocks (e.g., fault blocks 1001 and 1002 of FIG. 10). For example, the mesh may be generated so that the edges of the mesh do not cross the fault-network, where the connected sub-meshes are identified as the fault blocks.
7. Define the horizon function h(x,y,z) (e.g., horizon function h(x,y,z) 1000 of FIG. 10) to be built as a discrete-function on the mesh M and installing a smoothness constraint on the horizon function h(x,y,z).
8. Optionally, pre-synchronize the horizon function h(x,y,z) across the fault blocks (e.g., equating the values of the horizon function h(x,y,z) at points in different fault blocks that lie on the same horizon, such as, synchronizing points 1011 and 1012, 1021 and 1022 of FIG. 10).
9. Install DSI level-set constraints and/or DSI normal-direction constraints to be honored by the horizon function h(x,y,z) to be built.
10. Optionally install other constraints to be honored by the horizon function h(x,y,z) to be built.
11. Add specific constraints to ensure the uniqueness of the DSI solution function h(x,y,z).
12. Run the DSI method to interpolate the horizon function h(x,y,z) at the nodes of the mesh M while honoring the DSI constraints.
13. Detect and removing bubbles on the horizon function h(x,y,z).
14. Optionally, post-synchronize the horizon function h(x,y,z) across the fault blocks.
15. Visualize or display the horizon function h(x,y,z).

Importing a Fault-Network

A fault network (e.g., fault network 100 of FIG. 1 and/or fault network 1104 of FIG. 11) including a set of fault surfaces may be generated, retrieved or imported (e.g., received).

Importing a Series LLS of Level-Set-Samplings

Figure 14:
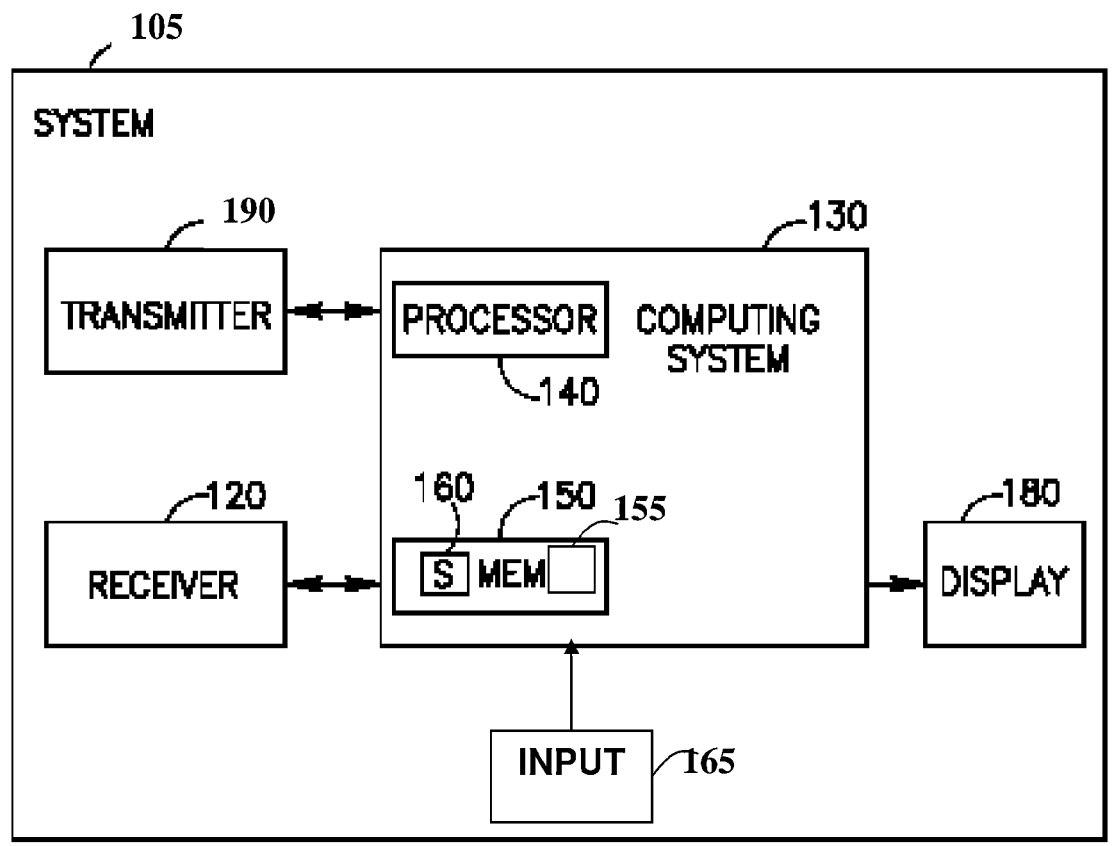
FIG. 14 is a schematic illustration of a system, in accordance with embodiments of the invention.

A non empty series LLS={$LS_1$, $LS_2$, ... } of Level-Set-Samplings may be imported defining geological data representing horizons. Each Level-Set-sampling $LS_k$ may include a set of sampling points (e.g., sampling points 702 of FIG. 7) determined to be located on the same horizon. Each Level-Set-sampling $LS_k$ may include, for example, a set of points located on the same horizon. Such horizon may be:

Manually interpreted by the user, e.g., by clicking or otherwise indicating (e.g., using a mouse or other pointing device, such as, input device 165 of FIG. 14, to indicate the point on a monitor or screen, or other methods), points on a seismic cube (e.g., seismic cube 400 of FIG. 4).

Automatically extracted from a seismic cube by "autopicking" the points from one or more "seed" points. The seed points may be selected, for example:

by a user, e.g., clicking or otherwise indicating points on the seismic cube using a mouse, e.g., seed points 502 of FIG. 5.

automatically generated from the seismic cube, e.g., seeds points 604 of FIG. 6A. In one example, the seed points may be (n) higher values of the seismic cube along a set of seismic traces (e.g., traces 404 of FIG. 4) of the seismic cube.

For each of these Level-Set-Samplings, the associated geological-time of deposition defining its relative position in the stratigraphic column may be unknown.

Importing a Series of Normal-Direction Constraints

A series of normal-direction constraints may be imported, in addition to or instead of the level set samplings. These constraints may be computed, for example, from:

the seismic data, for example, from dip and azimuth attributes, a direction on the seismic cube, e.g., selected by the user, the computation of a normal to the surface of the imported levels set samplings.

Some embodiments need not normalize or check the orientation of the vector normals computed from the dip/azimuth attributes or from the level set sampling normals, but only from the selected direction.

Editing the Series Levels Set Samplings LLS

The quality of the imported Level-Set-Samplings may be improved by an editing operation, especially when a Level-Set is auto-tracked, for example as follows (other operations may be used):

Merge the Level-Set-samplings $LS_k$ that overlap each other and correspond to the same horizon (e.g., to generate merged horizons 802 of FIG. 8).

Remove "spikes" on the Level-Set-sampling $LS_k$ (e.g., to generate smooth horizons 902 of FIG. 9). A spike may refer to a point $P(x_p,y_p,z_p)$ of the Level-Set-sampling $LS_k$ when the set of points $Q=\{Q_1(x_{q1},y_{q1},z_{q1}), Q_2(x_{q2}, y_{q2},x_{q2}), \ldots\}$ in the neighborhood of the point $P(x_p,y_p,z_p)$ are such that $z_{qi} \sim z_{qj}$ for any $_{i,j}$ of Q and $|z_p| >> |z_{qi}|$.

Fill in the holes of the Level-Set-sampling $LS_k$ caused by removing the spikes, for example, by interpolating horizon function values at the hole points to smoothly fit the based on function values at the points neighboring the holes.

Smooth the Level-Set-sampling $LS_k$ to reduce discontinuities or jumps in the horizon function values, for example, by interpolating the horizon function values across the studies domain so that, for example, the derivative of the horizon function assumes substantially the same value approaching each point from all directions.

Remove points of the Level-Set-sampling $LS_k$ adjacent to the faults.

Such editing may improve the continuity of the Level Sets Samplings and remove "noisy" points or discontinuities, for example, to improve the quality of the 3D mesh.

Building a 3D Mesh M

The studied domain may be covered with a 3D mesh M (e.g., mesh 200 of FIG. 2A and mesh 300 of FIG. 3) whose edges do not cross the fault network. Fault blocks may form from interrupting the mesh along the fault network. The 3D mesh and its fault blocks may be divided into cells, where each cell is 3D and may have a tetrahedral shape, a hexahedral shape and/or more generally a polyhedral shape.

Identifying Sub-Meshes $\{M_1, M_2, \ldots\}$ and Associated Fault-Blocks $\{F_1, F_2, \ldots\}$ A given node of the mesh M may be denoted by $(n_k)$ and connected subset of M including the node $(n_k)$ may be denoted by $M(n_k)$. The set $M(n_k)$ may be generated as the subset of nodes of the mesh M, which are connected to the node $(n_k)$ by at least one continuous polygonal curve including adjacent edges that do not cross any fault surface. The set $M(n_k)$ may be generated, for example, as follows (other operations may be used):

1. Initialize $M(n_k)$ as a set containing only the single node $(n_k)$.
2. For each node (n) of M not already contained in $M(n_k)$:
   a. If there is an edge $E(n_k,n)$ of the mesh M joining $(n_k)$ and (n), then add (n) to $M(n_k)$.
3. Stop.

Each node $(n_h)$ in the set $M(n_k)$ may be defined, such that, $M(n_h)=M(n_k)=M_k$.

A set of sub-meshes $LM=\{M_1, M_2, \ldots\}$ may be identified, for example, as follows (other operations may be used):

1. Initialize the set of sub-meshes LM as an empty list or set of sub-meshes.
2. Set k=1.
3. If a node $(n_k)$ does not belong to any sub-mesh of the list LM:
   a. Generate the set $M_k=M(n_k)$ and add $M_k$ to the list LM.
   b. Set k=k+1.
   c. Return to step 3.
4. Stop.

A set of fault blocks $LF=\{F_1, F_2, \ldots\}$ may be identified, for example, as follows (other operations may be used):

1. Generate the set of sub-meshes $LM=\{M_1, M_2, \ldots\}$.
2. For each k:
   Define $F_k$ as the set of cells of the mesh M whose vertices include nodes of $M_k$.
3. Stop.

Defining the Horizon Function h(x,y,z) as a Discrete Function on Mesh M

The horizon function h(x,y,z) whose Level-Set-Surfaces are coincident with horizons in the studied domain may be defined as a discrete function defined by its values $\{h(n_1), h(n_2), \ldots\}$ at the nodes of the mesh M, e.g., as shown in FIG. 10.

To ensure smooth variations of the horizon function h(x,y,z) within each fault block, a series of "smoothness" DSI constraints may be installed, e.g., as shown in FIG. 9. A smoothness DSI constraint to be honored by the horizon function h(x,y,z) may be generated, for example, as follows (other operations may be used):

1. Retrieve all pairs of topologically adjacent cells $(K_i,K_j)$ of the mesh M.
2. For each pair of topologically adjacent cells $(K_i,K_j)$ sharing common vertices of the mesh M:
   a. Install a DSI constant gradient constraint specifying that the (unknown) gradients within $K_i$ and $K_j$ are approximately equal, for example, in a least square sense.
3. Stop.

Pre-Synchronizing the Horizon Function h(x,y,z) within Each Fault Block

In FIG. 10, for any geological horizon 1010 located within two or more geometrically adjacent fault blocks $F_k$ 1001 and $F_s$ 1002 separated by a fault surface $F_{ks}$ 1003, the horizon function h(x,y,z) may honor a synchronization constraint. According to the synchronization constraint, for any pair of points $\{(x_k,y_k,z_k)$ 1011, $(x_s,y_s,z_s)$ 1012$\}$ belonging to horizon 1010, such that point $(x_k,y_k,z_k)$ 1011 belongs to $F_k$ 1001 and point $(x_s,y_s,z_s)$ 1012 belongs to $F_s$ 1002, for example:

$$h(x_k,y_k,z_k)-h(x_s,y_s,z_s)=0 \qquad (14A).$$

By honoring the synchronization constraint, the horizon function h(x,y,z) may be synchronized across each pair of geometrically adjacent fault blocks $F_k$ 1001 and $F_s$ 1002 separated by a fault surface $F_{ks}$ 1003. The horizon function h(x,y,z) may be pre-synchronized, for example, as follows (other operations may be used):

1. A series of pairs of synchronization points $SP=\{(x_{ki}, y_{ki},z_{ki}), (x_{si},y_{si},z_{si}): i=1, 2, \ldots\}$ may be selected, such that, for example:
   a. synchronization points $(x_{k1},y_{k1},z_{k1})$ 1011 and $(x_{s1}, y_{s1},z_{s1})$ 1012 belong to the same horizon $H_1$ 1010, and
   b. synchronization points $(x_{k1},y_{k1},z_{k1})$ 1011 and $(x_{s1}, y_{s1},z_{s1})$ 1012 belong to fault blocks $F_k$ 1001 and $F_s$ 1002, respectively,
   c. synchronization points $(x_{k2},y_{k2},z_{k2})$ 1021 and $(x_{s2}, y_{s2},z_{s2})$ 1022 belong to the same horizon $H_2$ 1020, and
   d. synchronization points $(x_{k2},y_{k2},z_{k2})$ 1021 and $(x_{s2}, y_{s2},z_{s2})$ 1022 belong to fault blocks $F_k$ 1001 and $F_s$ 1002, respectively,
   e. etc. to synchronization each pair i of points $(x_{ki},y_{ki}, z_{ki})$ 1011 and $(x_{si},y_{si},z_{si})$ 1012 in SP for each i.

These pairs of synchronization points may be selected, for example, interactively by a user clicking or otherwise indicating onto images of cross sections of the studied domain displayed on a computer screen using a mouse.
2. For each pair of synchronization points $\{(x_{ki},y_{ki},z_{ki}), (x_{si},y_{si},z_{si})\}$, e.g., defined according to equation (10A), the pre-synchronization constraint defined according to equation (14A) may be installed on the mesh, for example, as a DSI Delta equality constraint (10A), such that, for example:

$$h(x_{ki}, y_{ki}, z_{ki}) - h(x_{si}, y_{si}, z_{si}) = 0 \quad (14\text{Abis})$$

3. Stop

The horizon function $h(x,y,z)$ may originally be computed independently in each fault block. Synchronizing may conform the horizon function $h(x,y,z)$ across fault blocks so that points associated with the same horizon in different fault blocks have the same horizon function $h(x,y,z)$ value. "Pre-synchronization" may refer to synchronizing the horizon function $h(x,y,z)$, e.g., installing synchronization constraints, at a stage before the horizon function $h(x,y,z)$ is computed (as input to generating the horizon function $h(x,y,z)$), e.g., by installing "Level-Set" constraints. "Post-synchronization" may refer to synchronizing the horizon function $h(x,y,z)$ at a stage after the horizon function $h(x,y,z)$ is computed.

In addition to the pre-synchronization constraints, e.g., in cases where the fault style of a non-vertical fault is known (e.g., as normal fault 213 or reverse fault 223 in FIG. 2B), additional pre-synchronization constraints may be installed, for example, as follows (other operations may be used):

1. A series of pairs of synchronization points $SP = \{(x_{+i}, y_{+i}, z_{+i}), (x_{-i}, y_{-i}, z_{-i}): i=1, 2, \ldots\}$ may be selected, such that, for example, for all $i=1, 2, \ldots$:
   a. synchronization points $(x_{+i}, y_{+i}, z_{+i})$ 211 (resp. 221) and $(x_{-i}, y_{-i}, z_{-i})$ 212 (resp. 222) are collocated and belong to fault 213 (resp. 223),
   b. point $(x_{+i}, y_{+i}, z_{+i})$ 211 (resp. 221) is located on the positive side of fault 213 (resp. 223), and
   c. point $(x_{-i}, y_{-i}, z_{-i})$ 212 (resp. 222) is located on the negative side of fault 213 (resp. 223).
   These pairs of collocated points 211 and 212 may be selected, for example, interactively by a user clicking or otherwise indicating images of cross sections of the studied domain displayed on a computer screen using a mouse or touch-screen. Alternatively, these pairs of collocated points 211 and 212 may be automatically sampled on fault 213 (resp. 223).
2. If fault 213 is a normal fault, then, assuming for example, that the horizon function $h(x,y,z)$ is an increasing function of the unknown geological time, e.g., for all $i=1, 2, \ldots$ and according to equation (10B), the constraint defined according to equation (2N) may be installed on the mesh M as a DSI Delta inequality constraint, for example, as follows:

$$h(x_{-i}, y_{-i}, z_{-i}) - h(x_{+i}, y_{+i}, z_{+i}) \leq 0 \quad (2\text{Nbis}).$$

3. If fault 223 is a reverse fault, then, assuming for example, that the horizon function $h(x,y,z)$ is an increasing function of the unknown geological time, e.g., for all $i=1, 2, \ldots$ and according to equation (10B), the constraint defined according to equation (2R) may be installed on the mesh M as a DSI Delta inequality constraint, for example, as follows:

$$h(x_{+i}, y_{+i}, z_{+i}) - h(x_{-i}, y_{-i}, z_{-i}) \leq 0 \quad (2\text{Rbis})$$

4. Stop.

Alternatively or additionally to the DSI method, any equivalent method of synchronizing the horizon function $h(x,y,z)$ may be used.

Installing Level-Set Constraints on the Horizon Function $h(x,y,z)$

The "Level-Set" constraint may define that a Level-Set-Sampling $LS_h = \{(x_{h1}, y_{h1}, z_{h1}), (x_{h2}, y_{h2}, z_{h2}), \ldots\}$ including given points may be located on a Level-Set of the discrete function $h(x,y,z)$. For example, such a constraint may be implemented as a series of Delta equality constraints (e.g., defined according to equation (10)) specifying that the difference $\{h(x_{hi}, y_{hi}, z_{ihi}) - h(x_{hj}, y_{hj}, z_{hj})\}$ vanishes in a least square sense for any pair of points $\{(x_{hi}, y_{hi}, z_{hi}), (x_{hj}, y_{hj}, z_{hj})\}$ belonging to the Level-Set-Sampling $LS_h$:

$$h(x_{hi}, y_{hi}, z_{ihi}) - h(x_{hi}, y_{hj}, z_{hj}) = 0$$

for all pair $\{(x_{h1}, y_{h1}, z_{h1}), (x_{h2}, y_{h2}, z_{h2})\}$ belonging to $LS_h$ (11)

This new DSI Level-Set constraint may be applied whether or not the actual value of $h(x,y,z)$ on $LS_h$ is known. The DSI Level-Set constraint may be used according a variety of implementations including, for example:

A DSI Delta equality constraint may be installed between each successive points $(x_{hi}, y_{hi}, z_{hi})$ and $(x_{hi+1}, y_{hi+1}, z_{hi+1})$ of the Level-Set-Sampling $LS_h$.

A DSI Delta equality constraint may be installed between $(x_{h1}, y_{h1}, z_{h1})$ and any other point $(x_{hi}, y_{hi}, z_{hi})$ of the Level-Set-Sampling $LS_h$.

A reference point $(x_{h0}, y_{h0}, z_{h0})$ may be chosen in the set $LS_h$ and a DSI Delta equality constraint may be installed between the reference point $(x_{h0}, y_{h0}, z_{h0})$ and any other point $(x_{hi}, y_{hi}, z_{hi})$ of the Level-Set-Sampling $LS_h$.

Additional methods may be used to implement DSI Level-Set constraints.

In general, the DSI Level-Set constraints may be applied, for example, as follows (other operations may be used):

1. For each imported Level-Set-Sampling $LS_h$ belonging to the imported list LLS, the DSI Level-Set constraint associated to $LS_h$ may be installed.
2. Stop.

Installing Normal-Direction Constraints on the Horizon Function $h(x,y,z)$

A new DSI constraint may be referred to as the "Normal-Direction" constraint defining that the gradient of $h(x,y,z)$ at a given location $(x_i, y_i, z_i)$ is parallel to a given normal vector $N_i$. For example, if $(A \times B)$ is the cross product of two vectors A and B, then the normal-direction constraint may define the following equation where 0 (zero) represents the null vector:

$$\text{grad } h(x_i, y_i, z_i) \times N_i = 0 \quad (13)$$

Since the cross product (x) is a linear operator, each of the three dimensional components of this vector constraint may be turned into the canonical form (5) of a DSI constraint: the set of these three constraints associated with $\{(x_i, y_i, z_i), N_i\}$ may collectively be referred to as a DSI Normal-Direction constraint. Neither the orientation ($\pm N_i$) nor the length $\|N_i\|$ of the normal vector $N_i$ are used in this example of the Normal DSI constraint; in other embodiments, these items may be used.

Installing Other DSI Constraints on the Horizon Function $h(x,y,z)$

Optionally, additional DSI constraints may be installed on or applied to the discrete function $h(x,y,z)$ defined at the nodes of the mesh M. For example, a gradient constraint may be installed to set the gradient of $h(x,y,z)$ at a given location $(x_i, y_i, z_i)$ equal to a given vector $G_i$. Any other DSI constraint(s) may be applied to model the function $h(x,y,z)$.

Ensuring the Uniqueness of the DSI Solution for the Horizon Function $h(x,y,z)$

Installing the DSI constraints may be insufficient to ensure the uniqueness of the DSI solution for the function $h(x,y,z)$. For example, if only Level-Set constraints are applied, h(x,y,z) may be any constant function, which may be problematic since the level sets of h(x,y,z) are supposed to represent surfaces. If the DSI solution is indeterminate (e.g., non-unique), constraints may be added to ensure the uniqueness of the DSI solution, e.g., in each Fault-Block $F_k$.

For each fault block $F_k$, the uniqueness of the function h(x,y,z) on the Sub-Mesh $M_k$ associated with the Fault-Block $F_k$ may be ensured, for example, as follows:

In a first example, two nodes $(n_{k0})$ and $(n_{k1})$ of $M_k$ may be chosen in such a way that $(n_{k1})$ is above $(n_{k0})$ and a pair of DSI Control-Node DSI constraints may be installed defining, for example:

$$h(n_{k0})=h_0,$$

$$h(n_{k1})=h_1,$$

where $h_0$ and $h_1 > h_0$ are any two given distinct values. For example, $h_0=0$ and $h_0=1$.

In another example, a cell K of $M_k$ may be chosen and DSI gradient constraints may be installed such that the gradient of h(x,y,z) within K may be equal to a given vector orthogonal to a Virtual-Horizon crossing K.

Other DSI constraints may be used to ensure a unique solution for h(x,y,z) within each Fault-Block.

Interpolating the Horizon Function h(x,y,z) on the Mesh M

Once DSI constraints are install, the DSI method may be applied to each sub-mesh $M_k$ to find the values $\{h(n_1), h(n_2), \ldots\}$ corresponding to the sampling of the optimal solution of the horizon function h(x,y,z) at the nodes of the mesh M e.g., as shown in FIG. 10.

Alternatively or additionally, any equivalent method honoring the DSI constraints may be used instead of the DSI method.

Detecting and Removing "Bubbles"

Interpolation the horizon function h(x,y,z) with the DSI method (or with any other equivalent method) may generate a horizon function having a gradient that vanishes at some locations within the studied domain. When the gradient of the horizon function h(x,y,z) vanishes, the Level-Sets of the horizon function h(x,y,z) include closed surfaces called "bubbles" at those locations. These bubbles are error regions that inappropriately represent geological horizons. To ensure the coherency of the function h(x,y,z), bubbles may be detected and removed, for example, as follows (other series of operations may be used):

1. For each node (n) of the mesh M:
   a. Find a subset N(n) consisting of the nodes of the mesh M linked to the node (n) by an edge of M.
   b. Determine the minimum value $h_{min}$ and maximum value $h_{max}$ of the horizon function h(m) for each node (m) belonging to the subset N(n).
   c. If the value of the horizon function h(n) at the node (n) is not within the range $[h_{min}, h_{max}]$, then h(n) may be replaced by an arbitrary value within the range $[h_{min}, h_{max}]$. For example, h(n), may be assigned the value $(h_{min}+h_{max})/2$.
2. Stop.

Post-Synchronizing the Horizon Function h(x,y,z) within Each Fault Block

"Post-synchronization" may synchronize the horizon function h(x,y,z) after the implicit horizons function h(x,y,z) is generated. In FIG. 10, for a geological horizon 1010 located within two geometrically adjacent fault blocks $F_k$ 1001 and $F_s$ 1002 separated by a fault surface $F_{ks}$ 1003, the horizon function h(x,y,z) may include two possibly distinct constants $C_k$ and C such that, for example:

$$h(x,y,z)=C_k \text{ for any } (x,y,z) \text{ belonging both to } H \text{ and } F_k; \text{ and}$$

$$h(x,y,z)=C_s \text{ for any } (x,y,z) \text{ belonging both to } H \text{ and } F_s.$$

The horizon function h(x,y,z) may be synchronized across fault blocks so that the horizon function h(x,y,z) has the same constant value $C=C_k=C_s$ for any point (x,y,z) located on a horizon 1010 and belonging either to fault block $F_k$ 1001 or fault block $F_s$ 1002. To achieve such a constraint, the horizon function h(x,y,z) may be restricted to each fault block, where the restriction of the horizon function h(x,y,z) to fault block $F_k$ 1001 may be denoted as $h_k(x,y,z)$ and the restriction of the horizon function h(x,y,z) to $F_s$ 1002 may be denoted as $h_s(x,y,z)$. To synchronize the horizon functions restricted in separate fault blocks $h_k(x,y,z)$ and $h_s(x,y,z)$, a unique synchronized function h(x,y,z) may be defined, such that, for any horizon point (x,y,z) located within both fault blocks $F_k$ and $F_s$:

$$h(x,y,z)=h_k(x,y,z)=h_s(x,y,z) \text{ for any } (x,y,z) \text{ belonging to horizon } H \quad (14)$$

To build such a synchronized function h(x,y,z), a series of pairs of synchronization points $SP=\{(x_{ki},y_{ki},z_{ki}), (x_{si},y_{si},z_{si}): i=1, 2, \ldots\}$ may be selected, such that, for example:

a. synchronization points $(x_{k1},y_{k1},z_{k1})$ 1011 and $(x_{s1},y_{s1},z_{s1})$ 1012 belong to the same horizon $H_1$ 1010, and b. point $(x_{k1},y_{k1},z_{k1})$ 1011 belongs to fault block $F_k$ 1001 and point $(x_{s1},y_{s1},z_{s1})$ 1012 belongs to fault block $F_s$ 1002, c. synchronization points $(x_{k2},y_{k2},z_{k2})$ 1021 and $(x_{s2},y_{s2},z_{s2})$ 1022 belong to the same horizon $H_2$ 1020, and d. point $(x_{k2},y_{k2},z_{k2})$ 1021 belongs to fault block $F_k$ 1001 and point $(x_{s2},y_{s2},z_{s2})$ 1022 belongs to fault block $F_s$ 1002, f. etc. to synchronization each pair i of points $(x_{ki},y_{ki},z_{ki})$ 1011 and $(x_{si},y_{si},z_{si})$ 1012 in SP for each i.

These pairs of synchronization points may be selected, for example, interactively by a user clicking or otherwise indicating onto images of cross sections of the studied domain displayed on a computer screen using a mouse or touchscreen (e.g., input device 165 of FIG. 14).

A single horizon function h(x,y,z) honoring the constraint defined according to equation (14) may be generated, for example, as follows (other series of operations may be used):

1. For each pair of synchronization points $\{(x_{ki},y_{ki},z_{ki})$ and $(x_{si},y_{si},z_{si})\}$ in the set of synchronization points SP, the values $C_{ki}=h(x_{ki},y_{ki},z_{ki})$ and $C_{si}=h(x_{si},y_{si},z_{si})$ may be computed.

2. A synchronization function Synchro(c) may be generated, such that, for example:

$$\text{Synchro}(C_{si})=C_{ki} \text{ for all } i \quad (15)$$

For example, the synchronization function Synchro(c) may be generated as an interpolation or a least square approximation of the series of pairs of horizon function values $\{(C_{s1},C_{k1}), (C_{s2},C_{k2}), \ldots\}$.

3. For each node $(n_{kj})$ belonging to a Sub-Mesh $M_k$ within fault block $F_k$ 1001, the horizon function at the node $h(n_{kj})$ may be defined, for example, as follows:

$$h(n_{kj})=h_k(n_{kj}) \text{ for all } (n_{kj}) \text{ belonging to the Sub-Mesh } M_k \quad (16)$$

4. For each node $(n_{sj})$ belonging to the Sub-Mesh $M_s$ within fault block $F_s$ 1002, the horizon function at the node $h(n_{sj})$ may be defined, for example, as follows:

$$h(n_{sj})=\text{Synchro}(h_s(n_{sj})) \text{ for all } (n_{sj}) \text{ belonging to the Sub-Mesh } M_s \quad (17)$$

5. Stop.

The synchronization function may be applied to each pair $(F_k, F_s)$ of adjacent fault blocks 1001 and 1002. If there is only one fault block 1001, the synchronization function may not be applied. Moreover, at early stages of the exploration process, for example, where only the shape of horizons 1010 are modeled, the synchronization function may not be applied.

Alternatively or additionally to the DSI method, any equivalent method of synchronizing the horizon function $h(x,y,z)$ may be used.

Visualizing the Horizon Function $h(x,y,z)$

Figure 13:
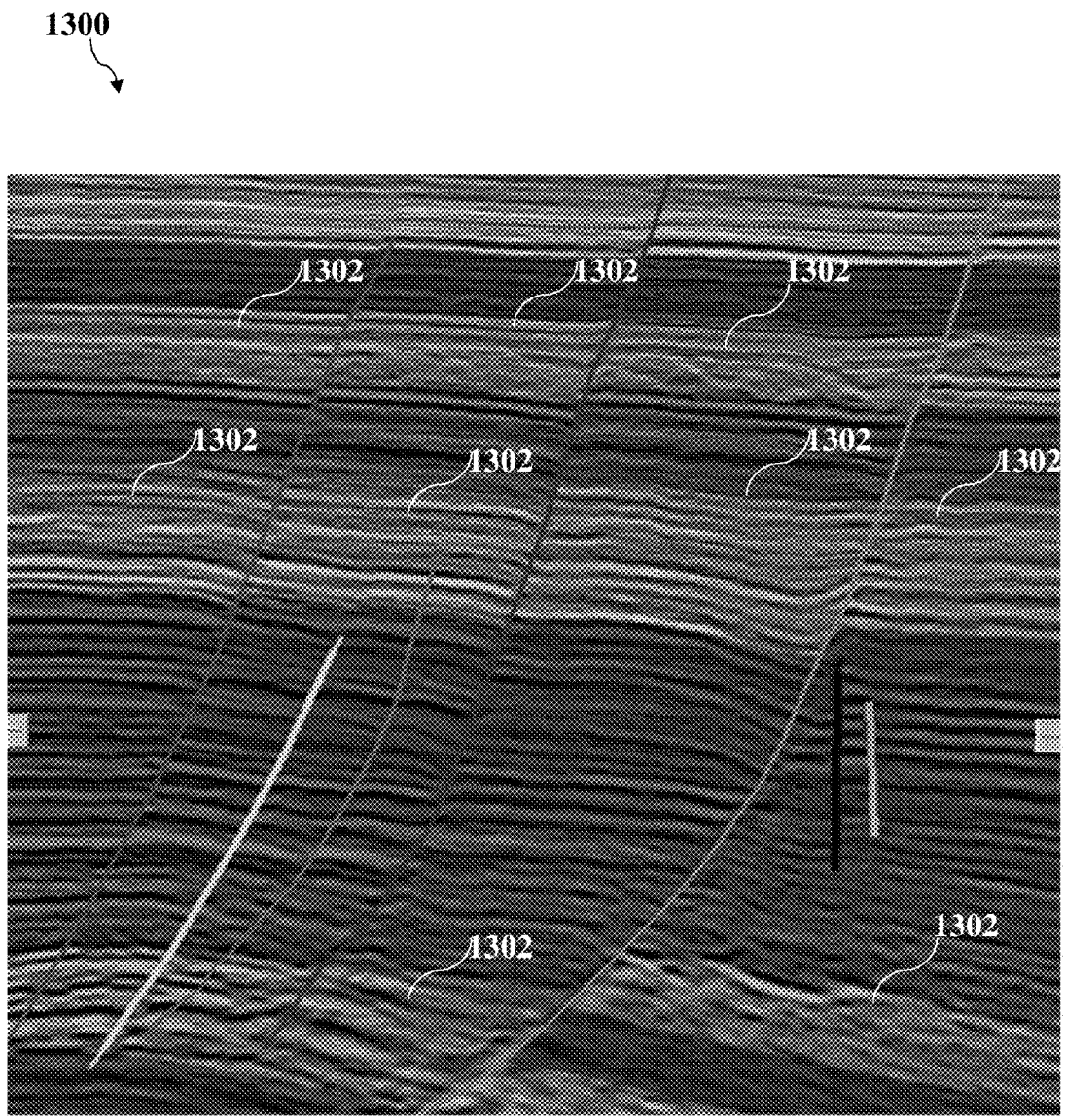
FIG. 13 is a schematic illustration of a visualization of the seismic amplitude of the horizon function h(x,y,z), in accordance with embodiments of the invention.

Reference is made to FIG. 13, which schematically illustrates a model 1300 of the seismic amplitude of the horizon function $h(x,y,z)$, in accordance with embodiments of the invention.

To control the quality of the horizon function h, the horizon function h may be visualized or displayed, for example, by extracting a particular Level Set of horizons 1102, 1202, and 1302 e.g., as shown in FIGS. 11, 12, and 13.

By graphically co-rendering seismic signals with the Level Sets of the horizon function $h(x,y,z)$ 1302 on cross sections, the quality of the horizon function $h(x,y,z)$ may be visually inspected, corrected and controlled, e.g., as shown in FIG. 13.

Embodiments of the invention may provide advantages over other systems. For example, other systems may, for example, have the following drawbacks (note some embodiments of the present invention may not address each and every drawback):

Solutions may not be guaranteed to be unique and/or optimal and, similarly to auto-picking methods, jumps may occur in the modeled horizons.

Solutions may not work when the input is a set of well-markers corresponding to the intersections of horizons with well-paths.

Lateral variations of geological facies along geological layers may induce a phenomenon referred to as "phase inversion" which introduces discontinuities between unwrapped phase. As a consequence, the seismic phase may vary along a given geological horizon implying that the seismic phase may be inappropriately identified with the horizon function $h(x,y,z)$.

Whenever a vertical seismic-trace crosses a fault, at the intersection point, the horizon function $h(x,y,z)$ may be discontinuous while the unwrapped seismic phase remains continuous: therefore, the seismic phase may be inappropriately identified with the horizon function $h(x,y,z)$.

Whenever a geostatistical method is used to model the horizon function $h(x,y,z)$ in place of the DSI method, there may be a severe lack of data to estimate the covariance function (e.g., used to model the horizon function $h(x,y,z)$).

Whenever normal vectors orthogonal to the horizons are deduced from seismic or well data, these normal vectors may only define the direction orthogonal to the horizons and the module and the orientation of these vectors may remain unknown. Therefore, identifying the gradient of the horizon function $h(x,y,z)$ with these normal vectors causes layers between horizons to have constant thickness, a very unlikely scenario, which may be disregarded. In contrast, the new DSI Normal-Direction constraint used in one embodiment of the present invention use neither the orientation nor the module of the normal vectors.

Taking faults into account may be difficult and becomes impracticable in the presence of a complex fault network with hundreds of faults.

It may be impossible to ensure that the horizons corresponding to level surfaces of the horizon function $h(x,y,z)$ are open surfaces. Due to outlier data or due to rapid lateral variations of the thickness of geological layers, some level surfaces of the horizon function $h(x,y,z)$ may be closed around some local maximum or minimum of the function.

Some methods only model a single geological surface S0 corresponding to the Level-Set-Surface $\{h(x,y,z)=0\}$. Therefore, in contrast to embodiments of the present invention, it may be impossible to model simultaneously a series of multiple horizons corresponding to a series of arbitrary values of the function $h(x,y,z)$.

Some methods only model a single geological surface S0 corresponding to the Level-Set-Surface $\{h(x,y,z)=0\}$. To remove the intrinsic ambiguity, points located on the "positive" side and "negative" side of the unique surface S0 may be manually identified to be modeled. In contrast, according to embodiments of the present invention, such a positive/negative polarity need not be used.

Some methods only model a single geological surface S0 corresponding to the Level-Set-Surface $\{h(x,y,z)=0\}$. Accordingly, the function $h(x,y,z)$ need not be monotonic and the Level-Set-Surface S0 may be a closed surface, which violates the structure of model horizons bounding geological layers.

In contrast, embodiments of the invention provide a system and method which may generate an implicit function $h(x,y,z)$ representing horizons, which may cure some or all of the aforementioned drawbacks. For example, embodiments of the invention may provide one or more of the following advantages (other or different advantages may occur):

The horizon function $h(x,y,z)$ may be global and provide a single unique and optimal solution.

The horizon function $h(x,y,z)$ may take discontinuities induced by faults into account automatically.

The horizon function $h(x,y,z)$ may not require the prior estimation of a variogram (measuring the spatial continuity or roughness of a data set) or equivalent information.

The horizon function $h(x,y,z)$ may not require the prior identification of points located on positive and negative sides of some surfaces.

The horizon function $h(x,y,z)$ may not require the prior identification of a set of completely interpreted horizons (e.g., the function may be extracted from a partial seismic volume). The function may be easily computed even if there are some gaps in the sampling horizons.

The horizon function $h(x,y,z)$ may be generated even if there is no seismic data and the data is reduced to a set of well-markers observed along well-paths.

The gradient of the horizon function $h(x,y,z)$ does not vanish, for example, implying that the level-set-surfaces of $h(x,y,z)$ are not closed surfaces.

The horizon function $h(x,y,z)$ may be insensitive to lateral variations of seismic phase.

If a horizon is defined by sampling points, then the value of the horizon function $h(x,y,z)$ need not be specified at these sampling points.

If vectors orthogonal to the horizons are given as input data, only the direction of these vectors may be used. The orientation and the length of these vectors may be freely chosen without impacting the shape of the horizon function $h(x,y,z)$.

Other advantages may be achieved.

Methods disclosed herein may be performed using a system 105 of FIG. 14. In other embodiments, methods used herein may be performed by different systems, having different components.

Reference is made to FIG. 14, which schematically illustrates a system 105 in accordance with an embodiment of the present invention.

System 105 may include a transmitter 190, a receiver 120, a computing system 130 and a display 180.

Transmitter 190 may transmit output signals, for example, acoustic waves, compression waves or other energy rays or waves, that may travel through subsurface (e.g., below land or sea level) structures. The transmitted signals may become incident signals that are incident to subsurface structures. The incident signals may reflect at various transition zones or geological discontinuities throughout the subsurface structures. The output frequency, wavelength and intensity of the seismic signals by transmitter 190 may be controlled by a computing system, e.g., computing system 130 or another computing system separate from or internal to transmitter 190.

Receiver 120 may accept reflected signal(s) that correspond or relate to incident signals, sent by transmitter 190.

Computing system 130 may include, for example, any suitable processing system, computing system, computing device, processing device, computer, processor, or the like, and may be implemented using any suitable combination of hardware and/or software. Computing system 130 may include for example one or more processor(s) 140, memory 150 and software 160. Data 155 generated by reflected signals, received by receiver 120, may be transferred, for example, to computing system 130. The data may be stored in the receiver 120 as for example digital information and transferred to computing system 130 by uploading, copying or transmitting the digital information. Processor 140 may communicate with computing system 130 via wired or wireless command and execution signals.

Memory 150 may include cache memory, long term memory such as a hard drive, and/or external memory, for example, including random access memory (RAM), read only memory (ROM), dynamic RAM (DRAM), synchronous DRAM (SD-RAM), flash memory, volatile memory, non-volatile memory, cache memory, buffer, short term memory unit, long term memory unit, or other suitable memory units or storage units. Memory 150 may store instructions (e.g., software 160) and data 155 to execute embodiments of the invention. Data 155 may include, for example, raw seismic data collected by receiver 120, instructions for partitioning a 3D mesh into fault blocks, instructions for generating a model, instructions for generating a discrete function h(x,y,z), instructions for interpolating the discrete function h(x,y,z) into a piecewise continuous function, instructions for synchronizing the function h(x,y,z) in each fault block so that the function is continuous across the boundaries between fault blocks, instructions for detecting and removing "bubbles", or other instructions or data. When discussed herein, manipulating geological data, such as the operations for calculating, generating, forming, cutting, dividing, etc., cells, fault-blocks, meshes, boxes, sub-meshes, may involve the manipulation of data stored in a memory which represents the corresponding geological structures, or the cells.

Input device(s) 165 may include a keyboard, pointing device (e.g., mouse, trackball, pen, touch screen), or cursor direction keys, for communicating information and command selections to processor 140. Input device 165 may communicate user direction information and command selections to the processor 140. For example, a user may use input device 165 to select one or more seed points in a model (e.g., by pointing a 'select' or 'highlight' button on a display 180 monitor adjacent to the model using a cursor controlled by a mouse or by highlighting and pressing a selection key on a keyboard).

Display 180 may display data from transmitter 190, receiver 120 or computing system 130. For example, display 180 may display visualizations or renderings on a display of subsurface models including a model of horizons as represented by the horizon function h(x,y,z).

Embodiments of the invention may include an article such as a computer or processor readable non-transitory storage medium, such as for example a memory, a disk drive, or a USB flash memory encoding, including or storing instructions, e.g., computer-executable instructions, which when executed by a processor or controller, cause the processor or controller to carry out methods disclosed herein.

The computing device may accept the data used in the aforementioned operations as for example a set of data reflected from a subsurface geological feature, or such data augmented by another process. The computing device may accept one or more of seismic and well data. The computing device may generate one or more of seismic and well data.

In the foregoing description, various aspects of the present invention have been described. For purposes of explanation, specific configurations and details have been set forth in order to provide a thorough understanding of the present invention. However, it will also be apparent to one skilled in the art that the present invention may be practiced without the specific details presented herein. Furthermore, well known features may have been omitted or simplified in order not to obscure the present invention. Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

Embodiments of the invention may manipulate data representations of real-world objects and entities such as underground geological features, including faults, horizons and other features. Data received by for example a receiver receiving waves generated by an air gun or explosives may be manipulated and stored, e.g., in memory 150, and data such as images representing underground features may be presented to a user, e.g., as a visualization on display 180.

Figure 15:
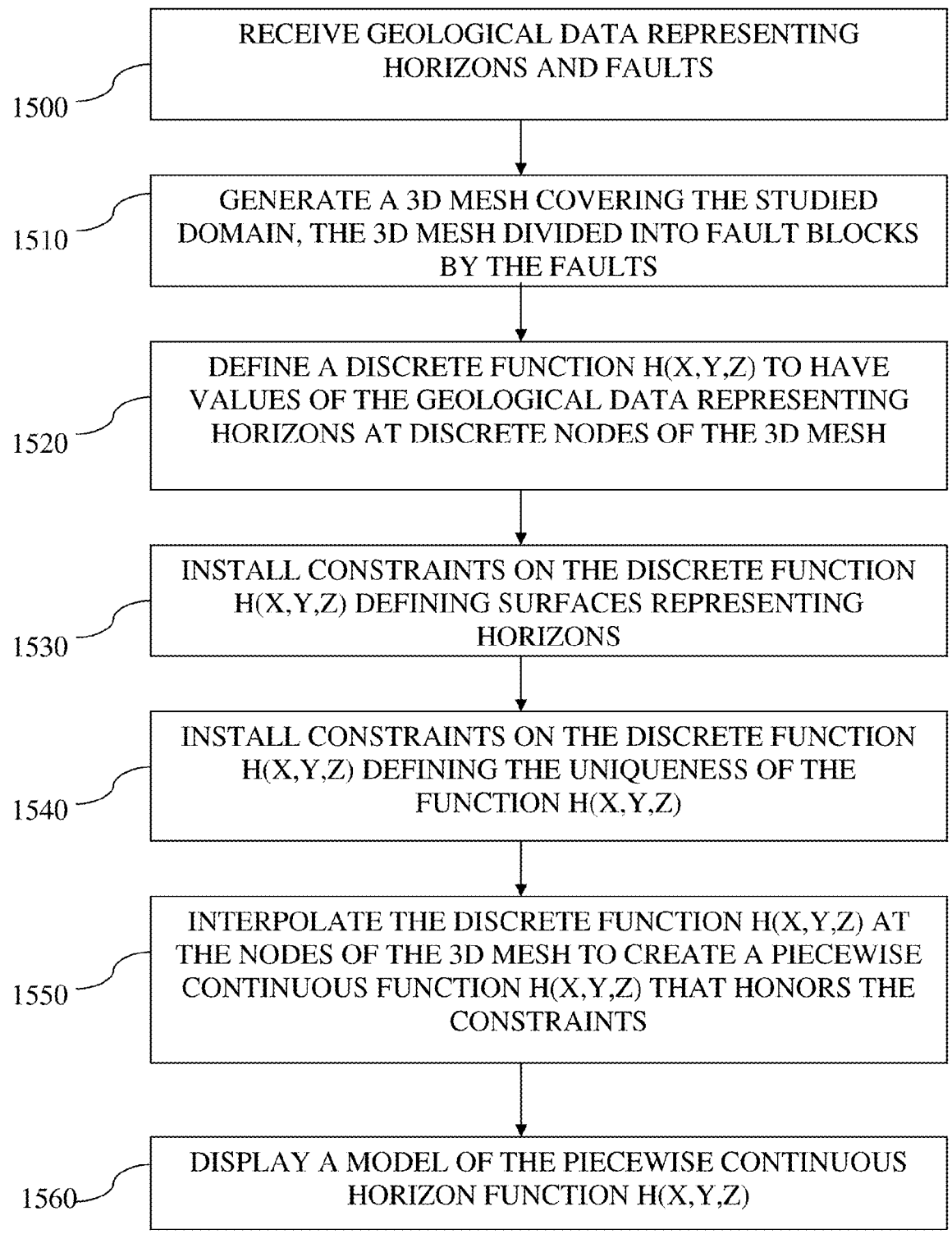
FIG. 15 is a flowchart of a method for generating the implicit horizon function h(x,y,z) in accordance with an embodiment of the present invention.

Reference is made to FIG. 15, which is a flowchart of a method for generating a model function h(x,y,z) implicitly representing geologic horizons in accordance with an embodiment of the present invention. Operations 1500-1560 may be executed using devices and components of the system of FIG. 1, for example, processor 140 may execute operations 1500-1550 and display 180 may execute operation 1560, although other devices and systems may be used to execute these operations.

In operation 1500, geological data may be received (e.g., by processor 140 from storage in memory 150 in FIG. 14) representing a fault network (e.g., fault network 100 of FIG.

1) and horizons (e.g., horizons 702, 802 and 902 of FIGS. 7-9) automatically extracted from seismic data (e.g., seismic cube 400 of FIG. 4) in a studied domain. For example, the geological data may be generated or recorded by devices such as transmitter 190 and receiver 120 of FIG. 14.

In operation 1510, a 3D mesh (e.g., mesh 300 of FIG. 3) may be generated that covers the studied domain. The 3D mesh may be divided into a plurality of fault blocks (e.g., fault blocks 200 of FIG. 2) by the fault network.

In operation 1520, a discrete function h(x,y,z) may be defined to have values at discrete nodes of the 3D mesh, where the values are based on the geological data representing the horizons.

In operation 1530, constraints may be installed on or applied to the discrete function h(x,y,z) to define surfaces representing horizons.

In operation 1540, constraints may be installed on or applied to the discrete function h(x,y,z) defining the uniqueness of the function h(x,y,z).

In operation 1550, the discrete function h(x,y,z) may be interpolated at the nodes of the 3D mesh to create a piecewise continuous function h(x,y,z) that honors the constraints.

In operation 1560, a model of the piecewise continuous horizon function h(x,y,z) may be displayed (e.g., at display 180 of FIG. 14). All horizons in the model may be simultaneously generated, for example, where the horizons are implicitly represented as level set surfaces of the discrete and/or piecewise continuous horizon function h(x,y,z).

Other or additional operations may be used.

When used herein, geological features such as horizons and faults may refer to the actual geological feature existing in the real world, or computer data representing such features (e.g., stored in a memory or mass storage device). Some features when represented in a computing device may be approximations or estimates of a real world feature, or a virtual or idealized feature. A model, or a model representing subsurface features or the location of those features, is typically an estimate or a "model", which may approximate or estimate the physical subsurface structure being modeled with more or less accuracy.

Embodiments described herein related to seismic data may also relate to well data. Furthermore, geological data may include any data related to geological structures, for example, extracted from seismic or well data, and faults may include faults, unconformities and discontinuities.

Different embodiments are disclosed herein. Features of certain embodiments may be combined with features of other embodiments; thus certain embodiments may be combinations of features of multiple embodiments.

It should be recognized that embodiments of the present invention may solve one or more of the objectives and/or challenges described in the background, and that embodiments of the invention need not meet every one of the above objectives and/or challenges to come within the scope of the present invention. While certain features of the invention have been particularly illustrated and described herein, many modifications, substitutions, changes, and equivalents may occur to those of ordinary skill in the art. It is, therefore, to be understood that the appended claims are intended to cover all such modifications and changes in form and details as fall within the true spirit of the invention.

What is claimed is:

1. A method for generating a model function h(x,y,z) implicitly representing geologic horizons, the method comprising:

receiving geological data representing a fault network and horizons automatically extracted from seismic data in a studied domain;

generating a three-dimensional (3D) mesh covering the studied domain, wherein the 3D mesh is divided into a plurality of fault blocks by the fault network;

defining a discrete function h(x,y,z) to have values of the geological data representing horizons at discrete nodes of the 3D mesh;

installing normal-direction constraints on the discrete function h(x,y,z) defining surfaces representing horizons, wherein the normal-direction constraints constrain the gradient of the discrete function h(x,y,z) at given locations to be parallel to and oriented in the same direction as vectors normal to planes tangent to horizons at the given locations, without defining the relative positions of the surfaces representing horizons;

interpolating the discrete function h(x,y,z) at the nodes of the 3D mesh to create a piecewise continuous function h(x,y,z) that honors the constraints;

simultaneously generating a plurality of geological horizons implicitly represented as a plurality of level set surfaces of the discrete function h(x,y,z); and displaying a model of the piecewise continuous horizon function h(x,y,z).

2. The method of claim 1, wherein the function h(x,y,z) is modeled to minimize the absolute value of a global cost function measuring a quality of the function h(x,y,z) within each fault block.

3. The method of claim 1 comprising editing the automatically extracted data.

4. The method of claim 1 comprising installing level-set constraints on the discrete function h(x,y,z) wherein the level-set constraints define points in each level set sampling to have the same discrete function h(x,y,z) value without defining the value of the discrete function h(x,y,z) defining surfaces representing horizons.

5. The method of claim 1, wherein the vectors normal to planes tangent to horizons are computed from dip and/or azimuth attributes or normal vectors of level set sampling points.

6. The method of claim 1, where only the direction and the orientation of vectors normal to planes tangent to horizons are used in the normal direction constraints to constrain the gradient of the discrete function h(x,y,z).

7. The method of claim 1 comprising installing smoothness constraints on the discrete function h(x,y,z) to ensure that the function varies continuously within each fault block.

8. The method of claim 1 comprising installing synchronizing constraints defining that points associated with the same horizon in different fault blocks have the same horizon function h(x,y,z) value.

9. The method of claim 1, wherein the piecewise continuous horizon function h(x,y,z) is pre-synchronized before the discrete function h(x,y,z) is computed.

10. The method of claim 1, wherein the piecewise continuous horizon function h(x,y,z) is post-synchronized after the discrete function h(x,y,z) is computed.

11. The method of claim 1, wherein the constraints are discrete-smooth-interpolation (DSI) constraints.

12. The method of claim 1, wherein interpolating is executed using discrete-smooth-interpolation (DSI).

13. The method of claim 1 comprising removing bubbles in the piecewise continuous horizon function h(x,y,z).

14. The method of claim 1 comprising generating and editing level set sampling points from the seismic data.

15. The method of claim 14, wherein the level set sampling points of the function h(x,y,z) form level set surfaces of the function h(x,y,z) that represent the geological horizons.

16. The method of claim 14, wherein the level set sampling points that represent a horizon may cover only a portion of the horizon.

17. The method of claim 14 wherein level set sampling points are edited to smooth the level set samplings, remove spikes in the level set samplings and merge overlapping level set samplings.

18. The method of claim 1, wherein the studied domain may include one or more regions for which there is no level set sampling.

19. The method of claim 1, wherein the seismic data includes a seismic cube or a set of seismic lines.

20. The method of claim 1 comprising installing one or more constraints on the discrete function h(x,y,z) defining the uniqueness of the function h(x,y,z).

21. The method of claim 20, wherein a uniqueness constraint defines that if a first node (n1) is located above a second node (n2), then the discrete function h(n1) of the first node is greater than the discrete function h(n2) of the second node.

22. The method of claim 20, wherein a uniqueness constraint defines, for a cell of the 3D mesh, that the gradient of the discrete function h(x,y,z) within the cell is equal to a vector orthogonal to a surface crossing the cell.

23. A system comprising:
a memory to store geological data representing a fault network and horizons automatically extracted from seismic data in a studied domain;
a processor to:
generate a three-dimensional (3D) mesh covering the studied domain, wherein the 3D mesh is divided into a plurality of fault blocks by the fault network,
define a discrete function h(x,y,z) to have values of the geological data representing horizons at discrete nodes of the 3D mesh,
install normal-direction constraints on the discrete function h(x,y,z) defining surfaces representing horizons, wherein the normal-direction constraints constrain the gradient of the discrete function h(x,y,z) at given locations to be parallel to and oriented in the same direction as vectors normal to planes tangent to horizons at the given locations, without defining the relative positions of the surfaces representing horizons,
interpolate the discrete function h(x,y,z) at the nodes of the 3D mesh to create a piecewise continuous function h(x,y,z) that honors the constraints;
simultaneously generate a plurality of geological horizons implicitly represented as a plurality of level set surfaces of the discrete function h(x,y,z); and
a display to display a model of the piecewise continuous horizon function h(x,y,z).

24. The system of claim 23, wherein the processor is to model the function h(x,y,z) to minimize the absolute value of a global cost function measuring a quality of the function h(x,y,z) within each fault block.

25. The system of claim 23, wherein the processor is to edit the automatically extracted data.

26. The system of claim 23 comprising installing level-set constraints on the discrete function h(x,y,z) wherein the level-set constraints define points in each level set sampling to have the same discrete function h(x,y,z) value without defining the value of the discrete function h(x,y,z) defining surfaces representing horizons.

27. The system of claim 23, wherein the processor is to compute the vectors normal to planes tangent to horizons from dip and/or azimuth attributes or normal vectors of level set sampling points.

28. The system of claim 23, wherein the processor is to use only the direction and the orientation of vectors normal to planes tangent to horizons in the normal direction constraints to constrain the gradient of the discrete function h(x,y,z).

29. The system of claim 23, wherein the processor is to install smoothness constraints on the discrete function h(x,y,z) to ensure that the function varies continuously within each fault block.

30. The system of claim 23, wherein the processor is to install synchronizing constraints defining that points associated with the same horizon in different fault blocks have the same horizon function h(x,y,z) value.

31. The system of claim 23, wherein the processor is to remove bubbles in the piecewise continuous horizon function h(x,y,z).

32. A method for generating a function h(x,y,z) implicitly representing geologic horizons, the method comprising:
defining a function h(x,y,z) to represent geological horizons without the prior identification of a set of completely interpreted horizons;
installing normal-direction constraints on the horizon function h(x,y,z), wherein the normal-direction constraints constrain the gradient of the discrete function h(x,y,z) at given locations to be parallel to and oriented in the same direction as vectors normal to planes tangent to horizons at the given locations, without defining the relative positions of the surfaces representing horizons;
simultaneously generating a plurality of horizons implicitly represented as a plurality of level set surfaces of the horizon function h(x,y,z) by honoring the level-set constraints; and
displaying a model of the plurality of horizons represented by the horizon function h(x,y,z).

33. The method of claim 32, wherein the horizon function h(x,y,z) is pre-synchronized across a plurality of fault blocks before the discrete function h(x,y,z) is computed.

34. The method of claim 32, wherein the horizon function h(x,y,z) is post-synchronized across a plurality of fault blocks after the discrete function h(x,y,z) is computed.

* * * * *